US009739191B2

(12) United States Patent
Amano

(10) Patent No.: US 9,739,191 B2
(45) Date of Patent: Aug. 22, 2017

(54) COOLING WATER CONTROL APPARATUS

(71) Applicant: TOYOTA JIDOSHA KABUSHIKI KAISHA, Toyota-shi, Aichi (JP)

(72) Inventor: Takashi Amano, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 216 days.

(21) Appl. No.: 14/434,499

(22) PCT Filed: Sep. 20, 2013

(86) PCT No.: PCT/JP2013/075493
§ 371 (c)(1),
(2) Date: Apr. 9, 2015

(87) PCT Pub. No.: WO2014/057791
PCT Pub. Date: Apr. 17, 2014

(65) Prior Publication Data
US 2015/0275741 A1    Oct. 1, 2015

(30) Foreign Application Priority Data

Oct. 11, 2012   (JP) ................. 2012-226378

(51) Int. Cl.
*F01P 7/14* (2006.01)
*F01P 7/16* (2006.01)
(Continued)

(52) U.S. Cl.
CPC .............. *F01P 7/14* (2013.01); *B60W 10/06* (2013.01); *B60W 20/00* (2013.01);
(Continued)

(58) Field of Classification Search
CPC . F01N 3/0205; F01P 3/20; F01P 7/165; F01P 7/14
See application file for complete search history.

(56) References Cited

U.S. PATENT DOCUMENTS

2005/0056413 A1* 3/2005 Homan ................. B60H 1/004
165/203
2007/0016355 A1* 1/2007 Kamado ............... E02F 9/2246
701/103
2007/0246554 A1 10/2007 Watanabe et al.

FOREIGN PATENT DOCUMENTS

JP    2005-083300 A    3/2005
JP    2005-319910 A    11/2005
(Continued)

*Primary Examiner* — Kevin A Lathers
(74) *Attorney, Agent, or Firm* — Andrews Kurth Kenyon LLP

(57) ABSTRACT

A cooling water control apparatus has a setting device which sets a target heat amount line such that a condition where a transferred heat amount which is transferred to a heater core is equal to a required heat amount which is required by the heater core is satisfied at a desired time point at which the transferred heat amount starts to be actually used, the target heat amount line representing a successive target value of the transferred heat amount during a period until the desired time point; and a first controlling device which makes a cooling water circulate in a first pipe, stops the circulation of the cooling water in a second pipe and adjusts an output of an engine such that the transferred heat amount follows the target heat amount line.

9 Claims, 7 Drawing Sheets

(51) Int. Cl.
  *F02D 41/40*   (2006.01)
  *B60W 10/06*   (2006.01)
  *B60W 20/00*   (2016.01)
  *F01P 3/20*    (2006.01)
  *F01N 3/02*    (2006.01)
  *F01N 9/00*    (2006.01)
  *B60K 6/445*   (2007.10)
  *F01N 5/02*    (2006.01)
  *F02D 41/08*   (2006.01)

(52) U.S. Cl.
  CPC ............. *F01N 3/0205* (2013.01); *F01N 9/00* (2013.01); *F01P 3/20* (2013.01); *F01P 7/165* (2013.01); *F02D 41/40* (2013.01); *B60K 6/445* (2013.01); *F01N 5/02* (2013.01); *F01N 2900/08* (2013.01); *F01P 2050/24* (2013.01); *F01P 2060/08* (2013.01); *F01P 2060/16* (2013.01); *F02D 41/086* (2013.01); *F02D 2200/1002* (2013.01); *Y02T 10/44* (2013.01); *Y02T 10/6239* (2013.01)

(56) References Cited

FOREIGN PATENT DOCUMENTS

| | | | |
|---|---|---|---|
| JP | 2011-99400 A | * | 5/2011 |
| JP | 2011-163185 A | | 8/2011 |

* cited by examiner

COOLING WATER CONTROL APPARATUS

CROSS-REFERENCE TO RELATED APPLICATIONS

This is a national phase application based on the PCT International Patent Application No. PCT/JP2013/075493 filed Sep. 20, 2013, claiming priority to Japanese Patent Application No. 2012-226378 filed Oct. 11, 2012, the entire contents of both of which are incorporated herein by reference.

TECHNICAL FIELD

The present invention relates to a cooling water control apparatus for controlling a cooling apparatus which cools and/or warms an engine by circulating cooling water, for example.

BACKGROUND ART

A technology for circulating a cooling water in order to cool and/or warm an engine is known heretofore. For example, a Patent Literature 1 discloses a technology for increasing a ratio of a driving power outputted by the engine by an amount which depends on a difference between a temperature of the cooling water which is required for a desired heating and a current temperature of the cooling water (namely, changing an operation of the engine such that an amount of a heat generation of the engine increases). As a result, the technology which is disclosed in the Patent Literature 1 allows the temperature of the cooling water to promptly reach a target value (namely, the temperature of the cooling water which is required for the desired heating).

In addition, a Patent Literature 2 is listed as a background art which is related to the present invention. The Patent Literature 2 discloses a technology for limiting an output of the engine and a motor when a temperature of the engine and the motor reaches an upper limit value at which an output limitation is required.

CITATION LIST

Patent Literature

[Patent Literature 1] Japanese Patent Application Laid Open No. 2005-319910
[Patent Literature 2] Japanese Patent Application Laid Open No. 2005-83300

SUMMARY OF INVENTION

Technical Problem

On the other hand, the technology which is disclosed in the Patent Literature 1 uses, as the target value of the temperature of the cooling water, the temperature itself of the cooling water which is required for the desired heating. Thus, the technology which is disclosed in the Patent Literature 1 may cause a rapid variation of the ratio of the driving power outputted by the engine due to a control of making the temperature of the cooling water reach the target value. For example, the technology which is disclosed in the Patent Literature 1 uses, as the target value of the temperature of the cooling water, the temperature itself of the cooling water which is required for the desired heating (namely, a relatively high temperature) even when the temperature of the cooling water is relatively low. Thus, the technology which is disclosed in the Patent Literature 1 sometimes performs the control of making the relatively low temperature of the cooling water rapidly reach the relatively high target value (namely, rapidly increasing the relatively low temperature of the cooling water). This control may cause the rapid variation of the ratio of the driving power outputted by the engine. As a result, a driver may experience an uncomfortable feeling, because the output of the engine rapidly varies.

The present invention is invented in view of the aforementioned problem, for example, and it is therefore an object of the present invention to provide, for example, a cooling water control apparatus which is configured to be capable of supplying the cooling water while suppressing the uncomfortable feeling which the driver experiences.

Solution to Problem

<1>

In order to solve the above described problem, the cooling water control apparatus of the present invention controls a cooling apparatus, the cooling apparatus has: (i) a first pipe in which a cooling water circulates between an exhaust heat recovery equipment and a heater core while bypassing an engine; and (ii) a second pipe in which the cooling water circulates between the engine and the heater core, the cooling water control apparatus has: a setting device which sets a target heat amount line such that a condition where a transferred heat amount which is transferred to the heater core is equal to a required heat amount which is required by the heater core is satisfied at a desired time point at which the transferred heat amount starts to be actually used, the target heat amount line represents a successive target value of the transferred heat amount during a period until the desired time point; and a first controlling device which (i-1) makes the cooling water circulate in the first pipe, (i-2) stops the circulation of the cooling water in the second pipe and (ii) adjusts an output of the engine such that the transferred heat amount follows the target heat amount line.

The cooling water control apparatus of the present invention is capable of controlling the cooling apparatus which cools the engine by circulating the cooling water.

The cooling apparatus has the first pipe and the second pipe.

The first pipe is a cooling water pipe for circulating the cooling water between the exhaust heat recovery equipment and the heater core. Especially, the first pipe corresponds to a bypass pipe which bypasses the engine (namely, which does not pass through the engine). Incidentally, the exhaust heat recovery equipment is an equipment for performing a heat transfer between an exhaust heat which is exhausted from the engine (for example, a heat which is caused by an exhaust gas) and the cooling water which passes through the exhaust heat recovery equipment. Typically, the exhaust heat recovery equipment transfers the exhaust heat which is exhausted from the engine to the cooling water which passes through the exhaust heat recovery equipment. The heater core is an equipment for performing a heat transfer between the cooling water which passes through the heater core and the heater core. Typically, the heater core recovers a heat of the cooling water which passes through the heater core. The heat which is recovered by the heater core is used for a heating or the like (for example, a heater, a defroster, a deice), for example.

The second pipe is a cooling water pipe for circulating the cooling water between the engine and the heater core.

The cooling water control apparatus has the setting device and the first controlling device to control the above described cooling apparatus.

The setting device sets the target heat amount line. Here, the "target heat amount line" represents the successive target value of the transferred heat amount during the period until the desired time point (for example, a period from a current time point to the desired time point) such that the condition where the transferred heat amount is equal to the required heat amount is satisfied at the desired time point. Especially, the target heat amount line represents, in advance before the desired time point, the successive target value of the transferred heat amount during the period until the desired time point. Furthermore, the target heat amount line represents not only the required heat amount corresponding to a final target value but also a transitional target value before reaching the final target value, because the target heat amount line represents the successive target value of the transferred heat amount during the period until the desired time point.

Incidentally, "the transferred heat amount being equal to the required heat amount" herein has a wider concept including a condition where the transferred heat amount is different from the required heat amount by a predetermined margin which is smaller than both amounts as well as a condition where the transferred heat amount is absolutely equal to the required heat amount. Namely, "the transferred heat amount being equal to the required heat amount" herein has a wide concept including a condition where the transferred heat amount is different from the required heat amount by a certain degree by which it can be determined that the transferred heat amount is substantially equal to the required heat amount. One example of the condition where the transferred heat amount is substantially equal to the required heat amount is a condition where an excess or a shortage of the transferred heat amount to the required heat amount does not have a large influence which can be recognized by the driver on the heating or the like.

Moreover, the "transferred heat amount" is a heat amount which is transferred to the heater core via the cooling water which passes through the heater core (in other words, a heat amount which is recovered by the heater core from the cooling water which passes through the heater core). Incidentally, the transferred heat amount may be equal to a heat amount which is outputted from the heater core for the purpose of the heating or the like, because the heat amount which is transferred to the heater core is directly used for the purpose of the heating or the like. Moreover, the "required heat amount" is a heat amount which is required by the heater core to perform the desired heating or the like (namely, a heat amount which should be transferred to the heater core or which the heater core should recover), for example. The purposeful desired heating or the like is realized when the transferred heat amount is equal to the required heat amount. On the other hand, the purposeful desired heating or the like is not realized when the transferred heat amount is less than the required heat amount.

Incidentally, the "desired time point" is a time point at which the transferred heat amount which is transferred to the heater core starts to be actually used for the heating or the like. The "use of the transferred heat amount" means a condition where the transferred heat amount which is transferred to the heater core is supplied to an outside of the heater core for the purpose which should be realized by the transferred heat amount. Typically, the "desired time point at which the transferred heat amount starts to be used" may be a time point at which a blower for supplying an air, which is heated by the transferred heat amount transferred to the heater core, to a cabin of a vehicle starts to operate. Incidentally, typically, the desired time point is a time point after a time point at which the target heat amount line is set (for example, the current time point).

The first controlling device controls the cooling apparatus (more specifically, a flow amount adjusting valve, an electric water pump or the like) to make the cooling water circulate in the first pipe and to stop the circulation of the cooling water in the second pipe. Furthermore, the first controlling device adjusts the output of the engine such that the transferred heat amount follows the target heat amount line. Namely, the first controlling device adjusts the output of the engine such that the successive transferred heat amount until the desired time point is equal to (in other words, is larger than, satisfies or its difference rate is smaller than a predetermined value) the successive target value which is represented by the target heat amount line. In other words, the first controlling device realizes the condition where the transferred heat amount is equal to the required heat amount by adjusting the output of the engine before the desired time point such that the transferred heat amount follows the target heat amount line.

Here, the adjustment of the output of the engine results in a variation of the exhaust heat (for example, a temperature of the exhaust gas) which is exhausted from the engine. The variation of the exhaust heat results in a variation of a water temperature of the cooling water which passes through the exhaust heat recovery equipment. The variation of the water temperature of the cooling water which passes through the exhaust heat recovery equipment results in a variation of the transferred heat amount which is transferred to the heater core. Therefore, the first controlling device is capable of making the transferred heat amount follow the target heat amount line by adjusting the output of the engine. As a result, the transferred heat amount is capable of being equal to the required heat amount at the time point at which the transferred heat amount which is transferred to the heater core starts to be used for the heating or the like. Therefore, the desired heating or the like which is originally desired by the driver can be performed at the desired time point.

Especially, the first controlling device adjusts the output of the engine on the basis of the target heat amount line which represents not only the required heat amount corresponding to the final target value but also the transitional target value before reaching the final target value. If there is a cooling water control apparatus in a comparative example (for example, the apparatus which is disclosed in the above described Patent Literature 1) which sets only the required heat amount corresponding to the final target value, there is a possibility that the adjustment amount (for example, the adjustment amount per unit time) of the output of the engine is relatively large to make the transferred heat amount be equal to the required heat amount in the cooling water control apparatus in the comparative example. As a result, the driver may experience an uncomfortable feeling due to the large adjustment amount of the output of the engine. However, the first controlling device adjusts the output of the engine on the basis of the target heat amount line which represents the transitional target value before reaching the final target value. Thus, the first controlling device is capable of making the transferred heat amount follow the target heat amount line and finally making the transferred heat amount be equal to the required heat amount while reducing the adjustment amount of the output of the engine, compared to the cooling water control apparatus in the comparative example. Especially, when the target heat amount line represents the target value which gradually increases to the required heat amount, for example, the first controlling device is capable of making the transferred heat amount follow the target heat amount line and finally making the transferred heat amount be equal to the required heat amount while reducing the adjustment amount of the output of the engine more effectively. Therefore, the uncomfortable feeling of the driver can be suppressed (for example, can be reduced or can be substantially or absolutely eliminated), because the adjustment amount of the output of the engine is reduced. The cooling water control apparatus of the present invention is practically very useful compared to the cooling water control apparatus in the comparative example which sets only the required heat amount corresponding to the final target value, because it has the above described effect.

In addition, the first controlling device is capable of actively adjusting the transferred heat amount before the transferred heat amount which is transferred to the heater core starts to be actually used (namely, before the desired time point). As a result, the transferred heat amount is equal to the required heat amount at the time point at which the transferred heat amount which is transferred to the heater core starts to be actually used. Therefore, the heating or the like which is originally desired by the driver is performed at the same time as the transferred heat amount which is transferred to the heater core starts to be actually used. Incidentally, in the above described Patent Literature 1, the transferred heat amount is not actively adjusted before the transferred heat amount which is transferred to the heater core starts to be actually used. Namely, the transferred heat amount is adjusted after the transferred heat amount which is transferred to the heater core starts to be actually used. Thus, the transferred heat amount is sometimes insufficient (namely, less than the required heat amount) after the transferred heat amount which is transferred to the heater core starts to be actually used. As a result, according to the above described Patent Literature 1, the adjustment amount of the output of the engine is easy to be relatively large to make the transferred heat amount be equal to the required heat amount rapidly. However, in the present invention, since the transferred heat amount can be actively adjusted before the transferred heat amount which is transferred to the heater core starts to be actually used, the transferred heat amount can be adjusted such that the transferred heat amount is equal to the required heat amount at the desired time point even if the adjustment amount of the output of the engine is relatively small.

As described above, the present invention is capable of adjusting the transferred heat amount on the basis of the target heat amount line which represents the transitional target value before reaching the final target value, before the transferred heat amount which is transferred to the heater core starts to be actually used. Therefore, it is possible to make the transferred heat amount follow the target heat amount line and finally make the transferred heat amount be equal to the required heat amount at the desired time point while reducing the adjustment amount of the output of the engine.

Incidentally, the first controlling device may minimalize the adjustment amount of the output of the engine in view of suppressing the uncomfortable feeling of the driver. For example, the first controlling device may adjust the output of the engine by an adjustment amount by which an influence of a ride quality is within an allowable range with considering a relationship between the variation of the output of the engine and a variation of the ride quality (for example, a presence or an absence of a vibration, an amount of the vibration, or the like) which is caused by the variation of the output. As a result, the uncomfortable feeling of the driver can be reduced or eliminated, compared to the case where the adjustment amount of the output of the engine is not minimalized. However, when the adjustment amount of the output of the engine is minimalized, the first controlling device may adjust a flow amount of the cooling water which circulates in the first pipe to make the transferred heat amount follow the target heat amount line, as described later. Alternatively, when the adjustment amount of the output of the engine is minimalized, a second controlling device which makes the cooling water circulate in the second pipe may be used to make the transferred heat amount follow the target heat amount line, as described later.

Moreover, the adjustment of the output of the engine may influence a driving performance of the vehicle. On the other hand, a hybrid vehicle, which moves by using an output of each of the engine and a rotation electrical machine, is capable of adjusting the output of the engine not to influence the driving performance of the vehicle by canceling the adjustment of the output of the engine by an adjustment of the output of the rotating electrical machine. Therefore, it is more preferable that the hybrid vehicle have the cooling water control apparatus of the present invention. However, the vehicle which moves by using the output of the engine may have the cooling water control apparatus of the present invention.

<2>

In another aspect of the cooling water control apparatus of the present invention, the target heat amount line represents, as the successive target value of the transferred heat amount, a continuous or discontinuous target value, which increases in a continuous manner or a stepwise manner during the period until the desired time point, of the transferred heat amount during the period until the desired time point.

According to this aspect, the target heat amount line represents, as the transitional target value before reaching the final target value, the continuous or discontinuous target value which gradually increases as the time passes (namely, increases in the continuous manner or the stepwise manner). Thus, the first controlling device is capable of making the transferred heat amount follow the target heat amount line and finally making the transferred heat amount be equal to the required heat amount at the desired time point while reducing the adjustment amount of the output of the engine. Therefore, the above described effect can be achieved appropriately.

<3>

In another aspect of the cooling water control apparatus of the present invention, the first controlling device adjusts the output of the engine such that the output of the engine increases or decreases by a fixed amount compared to the output before the output of the engine is adjusted.

According to this aspect, the adjustment amount of the output of the engine is fixed by the first controlling device. Namely, the adjustment amount of the output of the engine does not vary during a period when the output of the engine is adjusted. Thus, the uncomfortable feeling of the driver is reduced or eliminated, compared to the case where the adjustment amount of the output of the engine varies.

Incidentally, when the adjustment amount of the output of the engine is fixed, the first controlling device may adjust the flow amount of the cooling water which circulates in the first pipe to make the transferred heat amount follow the target heat amount line, as described later. Alternatively, when the adjustment amount of the output of the engine is fixed, the second controlling device which makes the cooling water circulate in the second pipe may be used to make the transferred heat amount follow the target heat amount line, as described later

<4>

Another aspect of the cooling water control apparatus of the present invention further has a second controlling device which (i) makes the cooling water circulate in the first pipe and (ii) makes the cooling water circulate in the second pipe when the transferred heat amount is less than the target heat amount line in spite of the adjustment of the output of the engine According to this aspect, the second controlling device controls the cooling apparatus to make the cooling water circulate in the second pipe in addition to the first controlling device controlling the cooling apparatus to make the cooling water circulate in the first pipe, when the transferred heat amount is not capable of following the target heat amount line in spite of the adjustment of the output of the engine. As a result, the cooling water whose water temperature is relatively high is supplied to the heater core via the second pipe. Namely, not only the heat amount recovered by the cooling water which passes through the exhaust heat recovery equipment (namely, the cooling water which circulates in the first pipe) but also a heat amount recovered by the cooling water which passes through the engine (namely, the cooling water which circulates in the second pipe) are transferred to the heater core. Therefore, the transferred heat amount is capable of following the target heat amount line even when the transferred heat amount is not capable of following the target heat amount line in spite of the adjustment of the output of the engine.

Incidentally, when the transferred heat amount is less than the target heat amount line, the first controlling device is capable of making the transferred heat amount follow the target heat amount line by additionally increasing the output of the engine. However, there is a possibility that the uncomfortable feeling of the driver becomes large due to the additional increase of the output of the engine. Therefore, in this aspect, the suppression of the uncomfortable feeling of the driver which is caused by more variation of the output of the engine is prioritized over a suppression of a deterioration of a fuel cost which is caused by the circulation of the cooling water in the second pipe.

<5>

In another aspect of the cooling water which has the second controlling device as described above, the second controlling device adjusts a flow amount of the cooling water which circulates in the second pipe such that the transferred heat amount follows the target heat amount line.

According to this aspect, the second controlling device is capable of making the transferred heat amount follow the target heat amount line by adjusting the flow amount of the cooling water which circulates in the second pipe, because the transferred heat amount which is transferred to the heater core via the cooling water which circulates in the second pipe increases as the flow amount of the cooling water which circulates in the second pipe increases.

In addition, in this aspect, the adjustment of the flow amount of the cooling water which circulates in the second pipe allows the transferred heat amount to follow the target heat amount line, instead of the additional adjustment of the output of the engine. Therefore, it is possible to make the transferred heat amount follow the target heat amount while suppressing the uncomfortable feeling of the driver.

<6>

In another aspect of the cooling water control apparatus which has the second controlling device as described above, (i) the first controlling device decreases an adjustment amount of the output of the engine and (ii) the second controlling device increases an adjustment amount of the flow amount of the cooling water which circulates in the second pipe, when a vehicle which has the cooling water control apparatus moves in a condition for giving weight to a ride quality, compared to the case where the vehicle moves in a condition for giving weight to a fuel cost.

According to this aspect, the adjustment of the flow amount of the cooling water which circulates in the second pipe (namely, the increase of the adjustment amount) allows the transferred heat amount to follow the target heat amount line, instead of the additional adjustment of the output of the engine (namely, the increase of the adjustment amount). Therefore, it is possible to make the transferred heat amount follow the target heat amount line while suppressing the uncomfortable feeling of the driver. Therefore, the suppression of the uncomfortable feeling of the driver which is caused by more variation of the output of the engine is prioritized over the suppression of the deterioration of the fuel cost which is caused by the circulation of the cooling water in the second pipe.

<7>

In another aspect of the cooling water control apparatus of the present invention, the first controlling device adjusts the output of the engine by adjusting a torque of the engine while maintaining a rotational number of the engine.

According to this aspect, the uncomfortable feeling of the driver which is caused by the variation of the output of the engine can be suppressed, compared to the case where the output of the engine is adjusted by adjusting the rotational number of the engine while maintaining the torque of the engine.

<8>

In another aspect of the cooling water control apparatus, the first controlling device (i) makes the cooling water circulate in the first pipe while adjusting a flow amount of the cooling water which circulates in the first pipe such that the transferred heat amount follows the target heat amount line and (ii) stops the circulation of the cooling water in the second pipe, when the adjustment of the flow amount of the cooling water which circulates in the first pipe allows the transferred heat amount to follow the target heat amount line under a condition where the circulation of the cooling water in the second pipe stops, the first controlling device (i-1) makes the cooling water circulate in the first pipe, (i-2) stops the circulation of the cooling water in the second pipe and (ii) adjusts the output of the engine such that the transferred heat amount follows the target heat amount line, when the adjustment of the flow amount of the cooling water which circulates in the first pipe does not allow the transferred heat amount to follow the target heat amount line under the condition where the circulation of the cooling water in the second pipe stops.

According to this aspect, the first controlling device adjusts the flow amount of the cooling water which circulates in the first pipe instead of adjusting the output of the engine, when the adjustment of the flow amount of the cooling water which circulates in the first pipe allows the transferred heat amount to follow the target heat amount line under the condition where the circulation of the cooling water in the second pipe stops. The adjustment of the flow amount of the cooling water which circulates in the first pipe results in an adjustment of a flow amount of the cooling water which passes through the exhaust heat recovery equipment. The adjustment of the flow amount of the cooling water which passes through the exhaust heat recovery equipment results in an adjustment of the heat amount which is transferred to the cooling water at the exhaust heat recovery equipment. The adjustment of the heat amount which is transferred to the cooling water at the exhaust heat recovery equipment results in an adjustment of the transferred heat amount which is transferred to the heater core. Therefore, the first controlling device is capable of making the transferred heat amount follow the target heat amount line by adjusting the flow amount of the cooling water which circulates in the first pipe.

On the other hand, the first controlling device adjusts the output of the engine in addition to or instead of adjusting the flow amount of the cooling water which circulates in the first pipe, when the adjustment of the flow amount of the cooling water which circulates in the first pipe does not allow the transferred heat amount to follow the target heat amount line under the condition where the circulation of the cooling water in the second pipe stops. As a result, the first controlling device is capable of making the transferred heat amount follow the target heat amount line as described above.

Incidentally, it is preferable that the first controlling device operate when the engine is warmed up.

According to this aspect, the cooling water control apparatus has the below described technical effect.

Firstly, when the adjustment of the flow amount of the cooling water which circulates in the first pipe allows the transferred heat amount to follow the target heat amount line under the condition where the circulation of the cooling water in the second pipe stops, the cooling water circulates in the first pipe and the cooling water remains in the second pipe by the operation of the first controlling device. Therefore, the heating of the cooling water remaining in the second pipe which passes through the engine is facilitated (namely, the cooling of the cooling water is inhibited), compared to the case where the cooling water circulates in the second pipe. As a result, the warm-up of the engine is facilitated. Therefore, the deterioration of the fuel cost is suppressed. In addition, in this case, the uncomfortable feeling of the driver is reduced or eliminated, because the output of the engine is not necessarily adjusted.

Moreover, even when the adjustment of the flow amount of the cooling water which circulates in the first pipe does not allow the transferred heat amount to follow the target heat amount line under the condition where the circulation of the cooling water in the second pipe stops, the cooling water circulates in the first pipe and the cooling water remains in the second pipe by the operation of the first controlling device. Therefore, the warm-up of the engine is facilitated. In addition, the adjustment of the flow amount of the cooling water which circulates in the first pipe allows the transferred heat amount to follow the target heat amount line. Thus, there is substantially or absolutely no influence on an operation (for example, the heating, the defroster, the deice or the like) which uses the transferred heat amount which is transferred to the heater core.

<9>

Another aspect of the cooling water control apparatus which adjusts the output of the engine when the adjustment of the flow amount of the cooling water which circulates in the first pipe does not allow the transferred heat amount to follow the target heat amount line further has a second controlling device which (i) makes the cooling water circulate in the first pipe and (ii) makes the cooling water circulate in the second pipe, when the adjustment of the flow amount of the cooling water which circulates in the first pipe does not allow the transferred heat amount to follow the target heat amount line under the condition where the circulation of the cooling water in the second pipe stops and the transferred heat amount is less than the target heat amount line in spite of the adjustment of the output of the engine.

According to this aspect, when the adjustment of the flow amount of the cooling water which circulates in the first pipe does not allow the transferred heat amount to follow the target heat amount line under the condition where the circulation of the cooling water in the second pipe stops and the transferred heat amount is less than the target heat amount line in spite of the adjustment of the output of the engine, the second controlling device controls the cooling apparatus such that the cooling water circulates in the second pipe and the first controlling device controls the cooling apparatus such that the cooling water circulates in the first pipe. In this case, the second controlling device may adjust the flow amount of the cooling water which circulates in the second pipe such that the transferred heat amount follows the target heat amount line. Therefore, both of the heat amount of the cooling water which circulates in the first pipe and the heat amount of the cooling water which circulates in the second pipe allows the transferred heat amount to follow the target heat amount line.

Incidentally, the second controlling device may adjust the flow amount of the cooling water which circulates in the second pipe without reducing the flow amount of the cooling water which circulates in the first pipe than the flow amount of the cooling water which circulates in the first pipe when the transferred heat amount is not less than the target heat amount line (for example, while keeping the flow amount of the cooling water which circulates in the first pipe at a maximum value). In this case, the increase of the flow amount of the cooling water which circulates in the second pipe can be minimized compared to a cooling water control apparatus in a comparative example by which the flow amount of the cooling water which circulates in the first pipe is reduced. Therefore, the flow amount of the cooling water which passes through the engine is relatively difficult to increase compared to the cooling water control apparatus in the comparative example. Thus, the heat amount which is generated by the engine is relatively difficult to be extracted by the cooling water compared to the cooling water control apparatus in the comparative example. Thus, the warm-up of the engine is easy to be facilitated compared to the cooling water control apparatus in the comparative example. Therefore, the deterioration of the fuel cost is appropriately suppressed.

Moreover, it is preferable that the second controlling device operate when the engine is warmed-up.

The operation and other advantages of the present invention will become more apparent from embodiments explained below.

DESCRIPTION OF EMBODIMENTS

Hereinafter, an embodiment in which the present invention is applied to a hybrid vehicle 1 will be explained, with reference to the drawings.

(1) Structure of Vehicle

Figure 1:
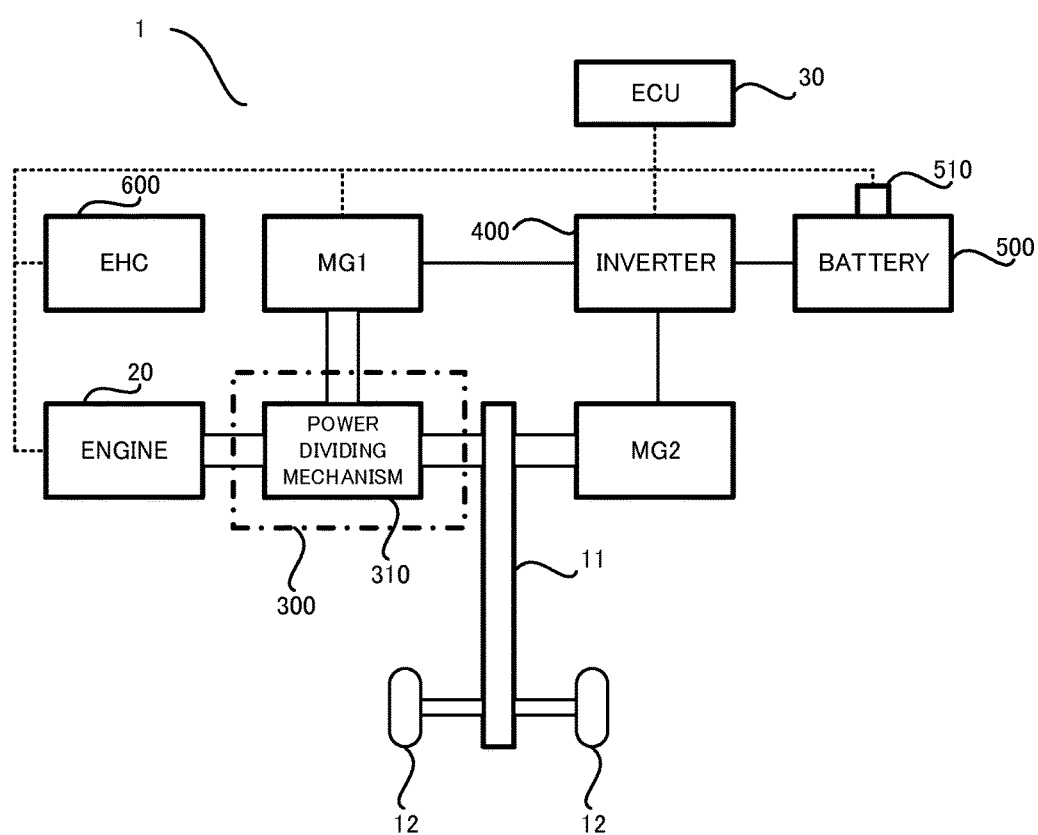
FIG. 1 is a block diagram illustrating one example of a structure of a hybrid vehicle of the present embodiment.

Firstly, with reference to FIG. 1, a structure of the hybrid vehicle 1 of the present embodiment will be explained. FIG. 1 is a block diagram illustrating one example of the structure of the hybrid vehicle 1 of the present embodiment.

As illustrated in FIG. 1, the hybrid vehicle 1 has an axle shaft 11, wheels 12, an engine 20, an ECU 30, a motor generator MG1, a motor generator MG2, a transaxle 300, an inverter 400, a battery 500 and SOC (State Of Charge) sensor 510.

The axle shaft 11 is a transmission shaft which transmits the power outputted from the engine 20 and the motor generator MG2 to the wheels.

The wheel 12 is a device for transmitting the power which is transmitted via the below described axle shaft 11 to a road. FIG. 1 illustrates an example in which the hybrid vehicle 1 has one wheel 12 at each of right and left sides. However, it is actually preferable that the hybrid vehicle 1 have one wheel 22 at each of a front-right side, a front-left side, a rear-right side and a rea-left side (namely, have four wheels 12 in total).

The ECU 30 is an electrical controlling unit which is configured to control the whole of the operation of the hybrid vehicle 1. The ECU 30 has a CPU (Central Processing Unit), a ROM (Read Only Memory), a RAM (Random Access Memory) and so on.

The engine 20 is a gasoline engine or a diesel engine which is one example of the "engine", and functions as a main power source of the hybrid vehicle 1.

The motor generator MG1 is one example of the "rotating electrical machine", and functions as a generator for charging the battery 500 or for supplying an electrical power to the motor generator MG2. Furthermore, the motor generator MG1 functions as a motor for assisting a driving power of the engine 20.

The motor generator MG2 is one example of the "rotating electrical machine", and functions as the motor for assisting the power of the engine 20. Furthermore, the motor generator MG2 functions as the generator for charging the battery 500.

Incidentally, each of the motor generator MG1 and the motor generator MG2 is a synchronous electrical motor generator. Therefore, each of the motor generator MG1 and the motor generator MG2 has a rotor having a plurality of permanent magnets on an outer surface thereof and a stator to which a three-phase coil for forming a rotating magnetic field is wound. However, at least one of the motor generator MG1 and the motor generator MG2 may be another type of the motor generator.

The transaxle 300 is a power transmission mechanism in which a transmission, a differential gear and the like are unified. Especially, the transaxle 300 has a power dividing mechanism 310.

The power dividing mechanism 310 is a planetary gear train including a sun gear, a planetary carrier, a pinion gear and a ring gear which are not illustrated. A rotating shaft of the sun gear which is located at an inner circumference is coupled with the motor generator MG1 and a rotating shaft of the ring gear which is located at an outer circumference is coupled with the motor generator MG2 among these gears. A rotating shaft of the planetary carrier which is located between the sun gear and the ring gear is coupled with the engine 20, a rotation of the engine 20 is transmitted to the sun gear and the ring gear by this planetary carrier and moreover the pinion gear and the power of the engine 20 is configured to be divided into two channels. In the hybrid vehicle 1, a rotating shaft of the ring gear is coupled with the axle shaft 11 of the hybrid vehicle 1 and the driving power is transmitted to the wheels 12 via the axle shaft 11.

The inverter 400 is configured to be capable of converting a DC (Direct Current) electrical power which is outputted from the battery 500 into an AC (Alternating Current) electrical power to supply it to the motor generator MG1 and the motor generator MG2 and converting the AC electrical power which is generated by the motor generator MG1 and the motor generator MG2 into the DC electrical power to supply it to the battery 500. Incidentally, the inverter 400 may be configured to be one portion of what we call a PCU (Power Control Unit)

The battery 500 is a rechargeable battery which is configured to be capable of functioning as an electrical power source of the electrical power which is used by the motor generator MG1 and the motor generator MG2 to operate.

Incidentally, the battery 500 may be charged by receiving the supply of the electrical power from an electrical source which is located at an outside of the hybrid vehicle 1. Namely, the hybrid vehicle 1 may be what we call a plug-in hybrid vehicle.

The SOC sensor 510 is a sensor which is configured to be capable of detecting a remaining battery level which represents a charge state of the battery 500. The SOC sensor 510 is electrically connected to the ECU 30 and a SOC value of the battery 500 which is detected by the SOC sensor 510 is configured to be always monitored by the ECU 30.

(2) Structure of Cooling Apparatus

Figure 2:
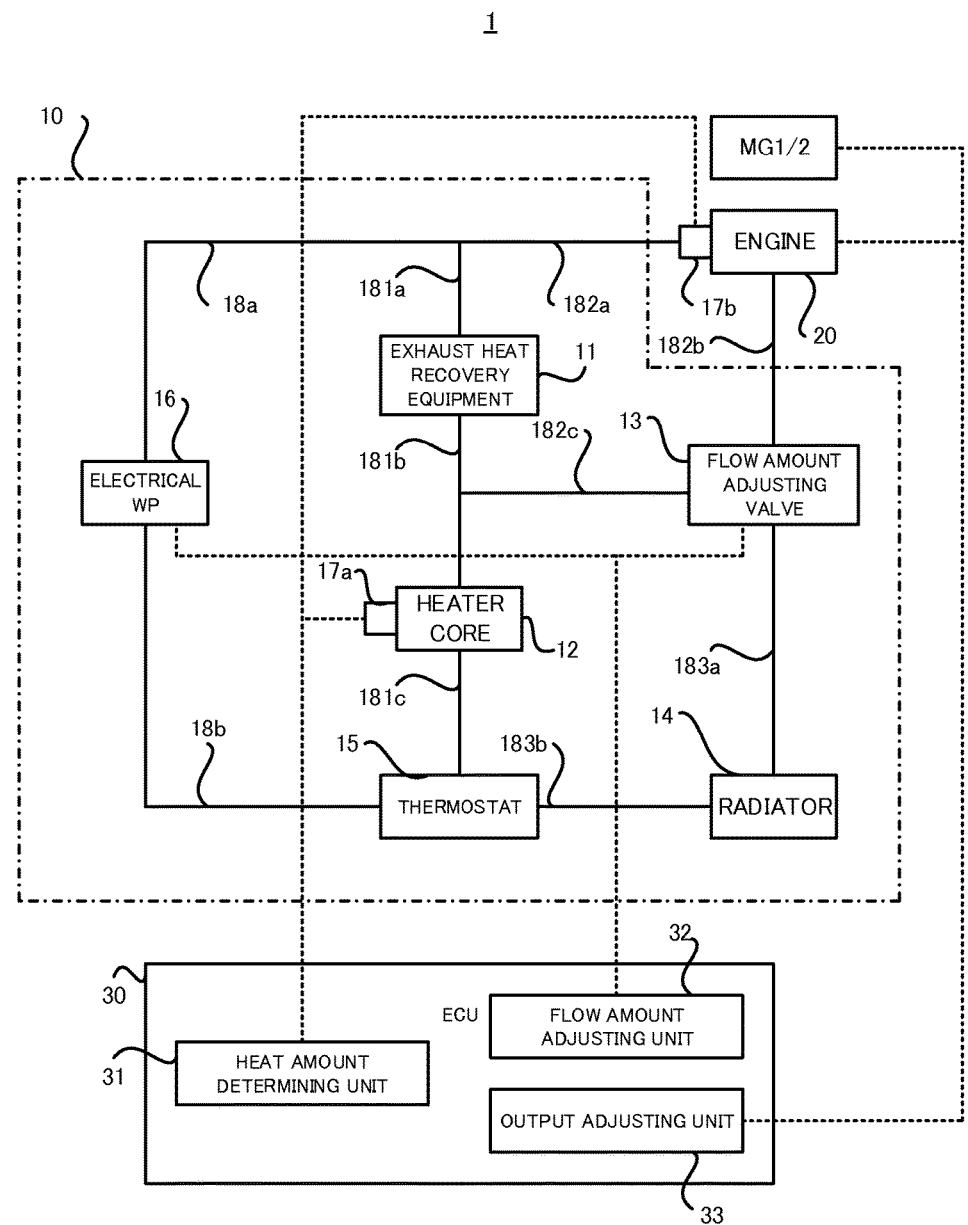
FIG. 2 is a block diagram illustrating a structure the vehicle of the present embodiment (especially, a structure relating to a cooling apparatus).

Next, with reference to FIG. 2, a structure of a cooling apparatus 10 which the hybrid vehicle 1 of the present embodiment has will be explained. FIG. 2 is a block diagram illustrating the structure of the cooling apparatus 10 which the hybrid vehicle 1 of the present embodiment.

As illustrated in FIG. 2, the cooling apparatus 10 which the hybrid vehicle 1 of the present embodiment has is an apparatus which supplies a cooling water to the engine 20.

The cooling apparatus 10 has an exhaust heat recovery equipment 11, a heater core 12, a flow amount adjusting valve 13, a radiator 14, a thermostat 15, an electrical WP (Water Pump) 16, a water temperature sensor 17a, and a water temperature sensor 17b. Moreover, the cooling apparatus 10 has a cooling water pipe 18 which includes a cooling water pipe 18a, a cooling water pipe 18b, a cooling water pipe 181a, a cooling water pipe 181b, a cooling water pipe 181c, a cooling water pipe 182a; a cooling water pipe 182b, a cooling water pipe 182c, a cooling water pipe 183a and a cooling water pipe 183b.

The electrical WP 16 is a pump which ejects a desired flow amount of the cooling water. The cooling water which is ejected from the electric WP 16 flows into the cooling water pipe 18a. The cooling water pipe 18a branches into the cooling water pipe 181a and the cooling water pipe 182a.

The cooling water pipe 181a is connected to the exhaust heat recovery equipment 11. The cooling water pipe 181b, which is connected to the heater core 12, extends from the exhaust heat recovery equipment 11. The cooling water pipe 181c, which is connected to the thermostat 15, extends from the heater core 12. The cooling water pipe 18b, which is connected to the electrical WP 16, extends from the thermostat 15. Namely, the cooling water which is ejected from the electric WP 17 returns to the electric WP 17 by passing through the cooling water pipe 18a, the cooling water pipe 181a, the cooling water pipe 181b, the cooling water pipe 181c and the cooling water pipe 18b in this order. Namely, the cooling water pipe 18a, the cooling water pipe 181a, the cooling water pipe 181b, the cooling water pipe 181c and the cooling water pipe 18b forms a bypass pipe which does not pass through the engine 20 (i.e. bypasses the engine 20). Incidentally, the bypass pipe is one example of the above described "first pipe".

On the other hand, the cooling water pipe 182a is connected to the engine 20. The cooling water pipe 182b, which is connected to the flow adjustment valve 13, extends from the engine 20. The cooling water pipe 182c, which is connected to the heater core 12, extends from the flow amount adjusting valve 13. Namely, the cooling water which is ejected from the electric WP 17 returns to the electric WP 17 by passing through the cooling water pipe 18a, the cooling water pipe 182a, the cooling water pipe 182b, the cooling water pipe 182c, the cooling water pipe 181c and the cooling water pipe 18b in this order. Namely, the cooling water pipe 18a, the cooling water pipe 182a, the cooling water pipe 182b, the cooling water pipe 182c, the cooling water pipe 181c and the cooling water pipe 18b forms a main pipe which passes through the engine 20 (i.e. does not bypass the engine 20) and does not pass through the radiator 14 (i.e. bypasses the radiator 14). Incidentally, the main pipe is one example of the above described "second pipe".

On the other hand, the cooling water pipe 183a, which is connected to the radiator 14, extends from the flow amount adjusting valve 13. The cooling water pipe 183b, which is connected to the thermostat 15, extends from the radiator 14. Namely, the cooling water which is ejected from the electric WP 17 returns to the electric WP 17 by passing through the cooling water pipe 18a, the cooling water pipe 182a, the cooling water pipe 182b, the cooling water pipe 183a, the cooling water pipe 183b and the cooling water pipe 18b in this order. Namely, the cooling water pipe 18a, the cooling water pipe 182a, the cooling water pipe 182b, the cooling water pipe 183a, the cooling water pipe 183b and the cooling water pipe 18b forms a sub pipe which passes through the engine 20 (i.e. does not bypass the engine 20) and passes through the radiator 14 (i.e. does not bypass the radiator 14).

The cooling water flows into the engine 20 via the cooling water pipe 182a. The cooling water which flows into the engine 20 passes through a water jacket of the engine 20 and then flows outwardly via the cooling water pipe 182b. The water jacket is located around a cylinder (not illustrated) in the engine 20. The cylinder exchanges heat with the cooling water which passes through the water jacket. As a result, the engine 20 is cooled.

Incidentally, a water temperature of the cooling water which passes through the engine 20 (hereinafter, it is referred to as "engine water temperature") is properly measured by the water temperature sensor 17b which is located in the engine 20 or in a vicinity of the engine 20. The engine water temperature which is measured by the water temperature sensor 17b is outputted to the ECU 30.

The exhausting heat recovery equipment 11 is located on an exhaust pipe (not illustrated) through which an exhaust gas ejected from the engine 20 passes. The cooling water passes through the exhausting heat recovery equipment 11. The exhausting heat recovery equipment 11 recovers an exhaust heat by exchanging a heat between the cooling water and the exhaust gas which pass through therein. Namely, the exhausting heat recovery equipment 11 is capable of heating up the cooling water by using the heat of the exhaust gas.

The heater core 12 recovers the heat of the cooling water by exchanging the heat between the air and the cooling water which pass through an inside of the heater core 12. In other words, the heat is transferred from the cooling water which passes through the inside of the heater core 12 to the heater core 12. The air heated by the heat which is recovered by the heater core 12 (in other words, the heat which is transferred to the heater core 12) is blew into a vehicle cabin by a fan which is referred to as a heater blower (not illustrated) for the purpose of a heating (for example, a heater, a defroster, a deice and the like).

Incidentally, a water temperature of the cooling water which passes through the heater core 12 (hereinafter, it is referred to as "heater water temperature") is properly measured by the water temperature sensor 17a which is located in the heater core 12 or in a vicinity of the heater core 12. The heater water temperature which is measured by the water temperature sensor 17a is outputted to the ECU 30.

The flow amount adjusting valve 13 is a valve (for example, a FCV (Flow Control Valve)) which is capable of changing an open/close state of a valve element. For example, when the flow amount adjusting valve 13 is closed, the flow amount adjusting valve 13 prevents the cooling water from flowing from the cooling water pipe 182b to the cooling water pipe 182c and from the cooling water pipe 182b to the cooling water pipe 183a. In this case, the cooling water remains in the cooling water pipe 182a, the cooling water pipe 182b, the cooling water pipe 182c, the cooling water pipe 183a and the cooling water pipe 183b. On the other hand, when the flow amount adjusting valve 13 is opened, the flow amount adjusting valve 13 allows the cooling water to flow from the cooling water pipe 182b to the cooling water pipe 182c and from the cooling water pipe 182b to the cooling water pipe 183a. In this case, the cooling water flowing outwardly from the engine 20 to the cooling water pipe 182b flows into the heater core 12 via the cooling water pipe 182c and into the radiator 14 via the cooling water pipe 183a. In addition, the flow amount adjusting valve 13 is capable of adjusting open degree of the valve element, under the control of the ECU 30. Namely, the flow amount adjusting valve 13 is capable of adjusting the flow amount of the cooling water which flows outwardly from the flow amount adjusting valve 13 to the cooling water pipe 182c (substantially, the flow amount of the cooling water in the main pipe) and the flow amount of the cooling water which flows outwardly from the flow amount adjusting valve 13 to the cooling water pipe 183a (substantially, the flow amount of the cooling water in the sub pipe).

In the radiator 14, the cooling water which passes through an inside of the radiator 14 is cooled by the air. In this case, the wind which is introduced by a rotation of the not-illustrated electrical fan facilitates the cooling of the cooling water in the radiator 14.

The thermostat 15 has a valve which is opened or closed depending on the temperature of the cooling water. Typically, the thermostat 15 opens its valve when the temperature of the cooling water is high (for example, is equal to or higher than a predetermined temperature). In this case, the cooling water pipe 183b is connected to the cooling water pipe 18b via the thermostat 15. As a result, the cooling water passes through the radiator 14. Thus, the cooling water is cooled and the excessive heating (overheat) of the engine 20 is prevented. On the other hand, the thermostat 15 closes its valve when the temperature of the cooling water is relatively low (for example, is not equal to or higher than the predetermined temperature). In this case, the cooling water does not pass through the radiator 14. Thus, the decrease of the temperature of the cooling water is prevented and the excessive cooling (overcool) of the engine 20 is prevented.

The electric WP 16 is configured to have an electric motor and circulates the cooling water in the cooling water pipe 18 by using the operation of the motor. Specifically, electric power is supplied to the electric WP 16 from a battery and a rotational number of the electric WP 16 and the like is controlled by a controlling signal supplied from the ECU 30. Incidentally, a mechanical water pump, which is capable of operating regardless of the operation of the engine 20 and being controlled by the ECU 30, may be used instead of the electric WP 16.

The ECU 30 is one example of the "cooling water control apparatus" and controls the cooling apparatus 10 (especially, controls a flow amount and a path of the cooling water in the cooling apparatus 10 and the like). The ECU 30 has a heat amount determining unit 31 which is one example of the "setting device", a flow amount adjusting unit 32 which is one example of the "first controlling device" and the "second controlling device" and a output adjusting unit 33 which is one example of the "first controlling device", in order to control the cooling apparatus 10 (especially, control a flow amount and a path of the cooling water in the cooling apparatus 10 and the like). Incidentally, a detailed operation of the heat amount determining unit 31, the flow amount adjusting unit 32 and the output adjusting unit 33 will be explained later in detail (see FIG. 3).

(3) Flow of Control of Cooling Apparatus

Figure 3:
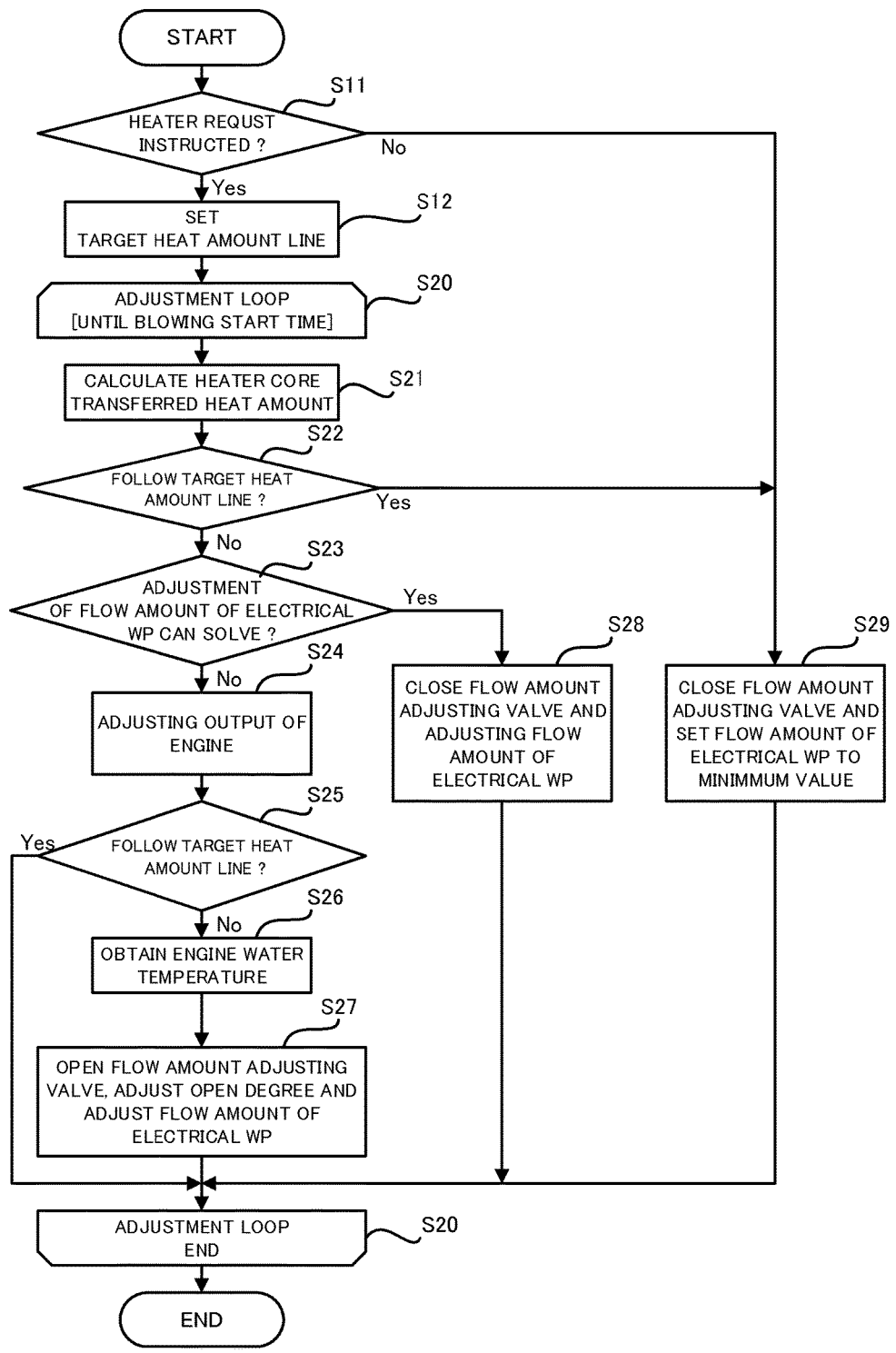
FIG. 3 is a flowchart illustrating the flow of the control of the cooling apparatus which is performed by the ECU of the present embodiment.

Next, with reference to FIG. 3, a flow of the control of the cooling apparatus 10 which is performed by the ECU 30 of the present embodiment will be explained. FIG. 3 is a flowchart illustrating the flow of the control of the cooling apparatus 10 which is performed by the ECU 30 of the present embodiment. Incidentally, it is preferable that the operation which is illustrated in FIG. 3 be an operation which is performed when the engine 20 is warmed-up (namely, the engine 20 in a cold condition is warmed-up).

As illustrated in FIG. 3, the heat amount determining unit 31 determines whether or not a heater request (for example, a request for the heating or the like using a heat which is transferred to the heater core 12 (in other words, the heat which the heater core 12 recovers)) is instructed (step S11). For example, when a driver of the vehicle 1 turns on a switch for the heating or the like, the heat amount determining unit 31 may determines that the heater request is instructed.

As a result of the determination at the step S11, when it is determined that the heater request is not instructed (step S11: No), the flow amount adjusting unit 32 controls the flow amount adjusting valve 13 such that the flow amount adjusting valve 13 is closed (step S29). As a result, the cooling water circulates in the bypass pipe and the cooling water remains in the main pipe and the sub pipe. In addition, the flow amount adjusting unit 32 controls the electrical WP 16 to set the flow amount of the cooling water which the electrical WP 16 ejects to a minimum value (step S29). As a result, the flow amount of the cooling water which circulates in the bypass pipe is set to a minimum value.

Figure 4:
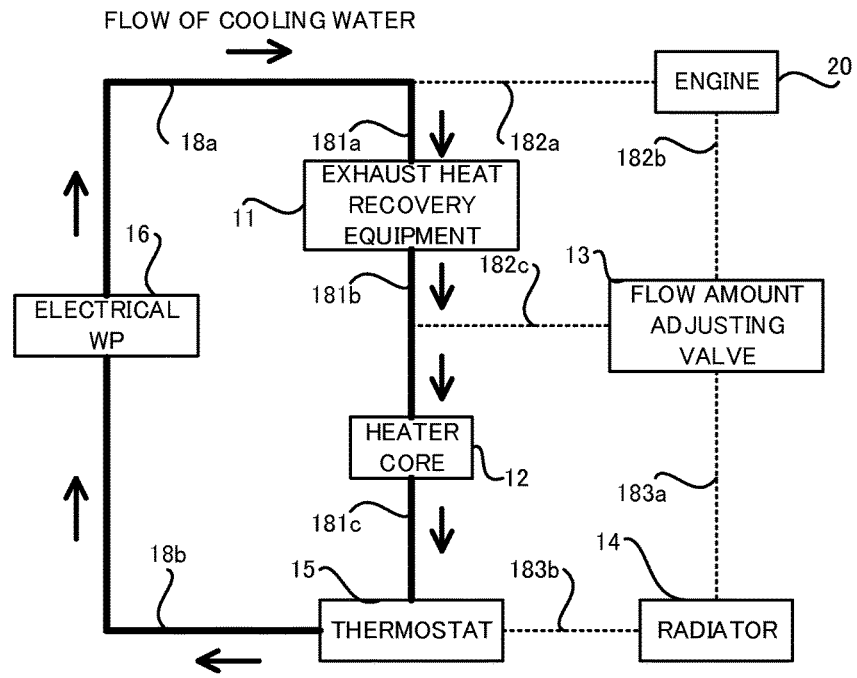
FIG. 4 is a block diagram illustrating the circulation aspect of the cooling water when the flow amount adjusting valve is closed.

Here, with reference to FIG. 4, a circulation aspect of the cooling water when the flow amount adjusting valve 13 is closed. FIG. 4 is a block diagram illustrating the circulation aspect of the cooling water when the flow amount adjusting valve 13 is closed.

As illustrated in FIG. 4, when the flow amount adjusting valve 13 is closed, the flow of the cooling water from the cooling water pipe 182b to the cooling water pipe 182c and the flow of the cooling water from the cooling water pipe 182b to the cooling water pipe 183a are prevented. Thus, the cooling water remains in the cooling water pipe 182a, the cooling water pipe 182b and the cooling water pipe 182c which form the main pipe. Similarly, the cooling water remains in the cooling water pipe 183a and the cooling water pipe 183b which form the sub pipe. On the other hand, the cooling water circulates in the cooling water pipe 18a, the cooling water pipe 181a, the cooling water pipe 181b, the cooling water pipe 181c and the cooling water pipe 18b which form the bypass pipe. Incidentally, the arrows in FIG. 4 illustrate the flowing direction of the cooling water.

Again in FIG. 3, on the other hand, As a result of the determination at the step S11, when it is determined that the heater request is instructed (step S11: Yes), it is predicted that the a switch of the heater blower will be turned on for the heating or the like which is requested by the heater request after a predetermined time elapses. As a result, it is predicted that the air heated by the heat which is transferred to the heater core 12 starts to be supplied into the vehicle cabin. In the present embodiment, the cooling apparatus is controlled such that a heat amount which is transferred to the heater core (hereinafter, it is referred to as a "heater core transferred heat amount") is actively adjusted during a period after it is determined that the heater request is instructed (namely, the switch of the heating or the like is turned on) and before the heated air starts to be supplied (namely, the switch of the heater blower is turned on). Specifically, in the present embodiment, the heater core transferred heat amount is actively adjusted such that the heater core transferred heat amount is equal to be a heat amount which is required by the heater core (namely, a heat amount which is required for a desired intensity of the heating or the like which is requested by the heater request, and hereinafter, it is referred to as a "heater core required heat amount") at a time when the heated air starts to be supplied (hereinafter, it is referred to as a "blowing start time"). Namely, in the present embodiment, the heater core transferred heat amount is actively adjusted before the blowing start time. Hereinafter, an aspect of adjusting the heater core transferred heat amount before the blowing start time will be explained in detail.

Firstly, the heat amount determining unit 31 set a target heat amount line before the heater core transferred heat amount starts to be actually adjusted (step S12). The target heat amount line represents a target value of the heater core transferred heat amount in chronological order during a period after a timing when the target heat amount line is set (for example, a current time) and before the blowing start time. In this case, the target heat amount line represents the target value of the heater core transferred heat amount during the period from the current time to the blowing start time such that the heater core transferred heat amount is equal to be the heater core required heat amount (namely, the heater core required heat amount is satisfied by the heater core transferred heat amount) at the blowing start time.

Figure 5:
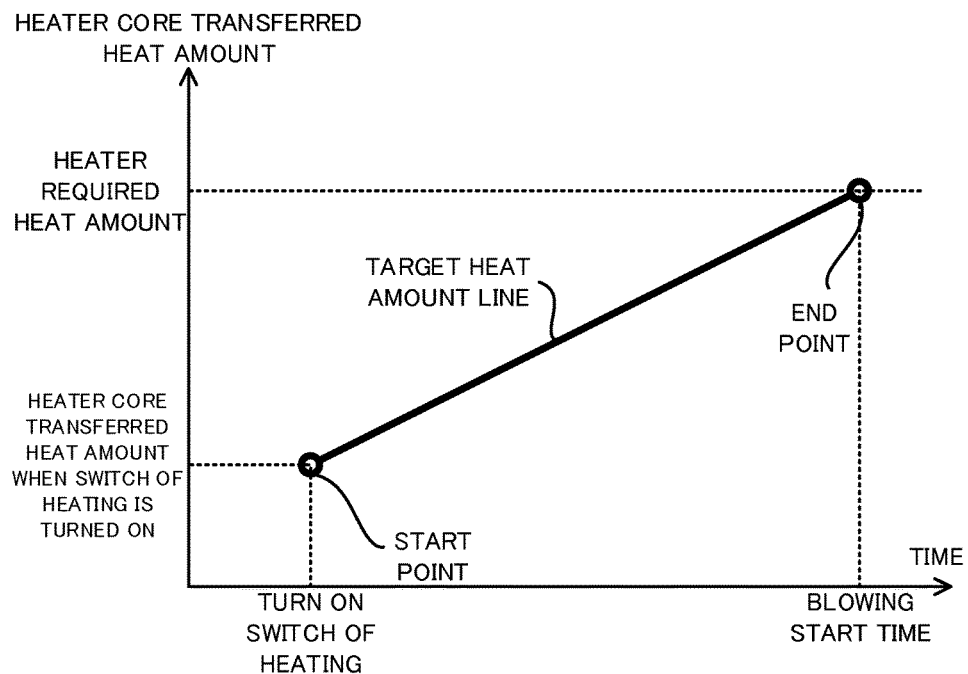
FIG. 5 is a graph illustrating a target heat amount line.

Here, with reference to FIG. 5, the target heat amount line which is set by the heat amount determining unit 31 will be explained. FIG. 5 is a graph illustrating the target heat amount line.

As illustrated in FIG. 5, the target heat amount line may be a graph which is capable of representing a relationship between the time and the heater core transferred heat amount. In the graph illustrated in FIG. 5, a horizontal axis represents the time and a vertical axis represents the heater core transferred heat amount.

As illustrated in FIG. 5, it is preferable that a start point of the target heat amount line be a point which corresponds to the heater core transferred heat amount at the current time (for example, at a timing when the switch of the heating is turned on or a timing when the target heat amount line is set). Incidentally, the heater core transferred heat amount at the current time is calculated on the basis of the heater water temperature at the current time and the flow amount of the cooling water which passes through the heater core 12 at the current time, for example. The heater water temperature at the current time is outputted from the water temperature sensor 17a, for example. Moreover, the flow amount of the cooling water which passes through the heater core 12 at the current time is easily calculated on the basis of a controlled amount of the electrical WP 16, for example. Therefore, the heat amount determining unit 31 is capable of setting the start point of the target heat amount line relatively easily.

However, the start point of the target heat amount line may be a point which is different from the point which corresponds to the heater core transferred heat amount at the current time. For example, the start point of the target heat amount line may be a point which corresponds to the heater core transferred heat amount of the engine in the cold condition (namely, the heater core transferred heat amount corresponding to a soak temperature.

In addition, as illustrated in FIG. 5, it is preferable that an end point of the target heat amount line be a point which corresponds to the heater core required heat amount at the blowing start time. Incidentally, the heater core required heat amount is easily calculated on the basis of an operational aspect of the switch used by the driver for designating the intensity of the heating or the like, for example. The blowing start time is set in advance depending on a specification of the hybrid vehicle 1, for example. Therefore, the heat amount determining unit 31 is capable of setting the end point of the target heat amount line relatively easily.

It is preferable that the heat amount determining unit 31 set a continuous line extending from the start point to the end point after the start point and the end point of the target heat amount are set. As a result, the heat amount determining unit 31 is capable of setting the target heat amount line as the continuous line appropriately.

Incidentally, it is preferable that the target heat amount line be a line which increases in a continuous manner or a stepwise manner from the start point to the end point. Moreover, the target heat amount line may be a line which increases at a fixed increasing rate from the start point to the end point (namely, a line which increases at a constant increasing rate until the blowing start time). Alternatively, the target heat amount line may be a line which increases at a variable increasing rate from the start point to the end point (namely, a line which increases at increasing rate which varies depending on the time). In an example illustrated in FIG. 5, the target heat amount line is the line which increases at the fixed increasing rate from the start point to the end point (namely, a line which can be expressed by a linear function). However, the target heat amount line may increase in any aspect from the start point to the end point as long as it is a line in which the target value of the heater core transferred heat amount at the blowing start time is equal to (in other words, satisfies) the heater core required heat amount. For example, the target heat amount line may be a line which decreases at one portion of the time.

Moreover, the target heat amount may be a line in which a condition where the heater core transferred heat amount is equal to the heater core required heat amount is realized for the first time at the blowing start time. Alternatively, the target heat amount may be a line in which the condition where the heater core transferred heat amount is equal to the heater core required heat amount is realized before the blowing start time.

Moreover, the target heat amount line may include a line which represents the target value at the time before the above described start point (namely, a line which extends to a left side of the start point in FIG. 5). Similarly, the target heat amount line may include a line which represents the target value at the time after the above described end point (namely, a line which extends to a right side of the end point in FIG. 5).

Incidentally, in FIG. 5, the target heat amount line is expressed in a form of the graph. However, the target heat amount line may be any form of information as long as it is capable of continuously or discontinuously representing the relationship between the time and the heater core transferred heat amount. A table, a map, a numerical sequence, a function, a database or the like is listed as one example of the information, for example.

Moreover, in FIG. 5, the target heat amount line is expressed as the continuous line. However, the target heat amount line may be a set of discontinuous (discrete) points on the continuous line. In other words, the target heat amount line may be a set of the discontinuous points (namely, a set of target values each of which is related to a certain time) which is capable of approximating a virtual line extending from the above described start point to the above described end point.

Then, the cooling apparatus 10 is controlled such that the heater core transferred heat amount follows the target heat amount line as time passes. Namely, the cooling apparatus 10 is controlled such that the actual heater core transferred heat amount at each time during the period before the blowing start time is equal to the target value at each time which is represented by the target heat amount line. In other words, the cooling apparatus 10 is controlled such that the actual heater core transferred heat amount at each time during the period before the blowing start time satisfies (namely, is larger than) the target value at each time which is represented by the target heat amount line. Incidentally, it is preferable that the below described operation (namely, the operation from step S13 to step S24) be performed at a plurality of proper time before the target heat amount line is set and after the blowing start time. Namely, it is preferable that the below described operation (namely, the operation from step S13 to step S24) be repeatedly performed until the blowing start time (step S20). Moreover, the below described operation (namely, the operation from step S13 to step S24) may be regularly, periodically or randomly performed before the target heat amount line is set and after the blowing start time Again in FIG. 3, the heat amount determining unit 31 calculates the heater core transferred heat amount after the target heat amount is set (step S21). Incidentally, as described above, it is easily calculated on the basis of the heater water temperature and the flow amount of the cooling water which passes through the heater core 12. Alternatively, the heat amount determining unit 31 may predict or forecast the heater core transferred heat amount on the basis of an output of the engine 20, a heat amount which can be recovered by the exhaust heat recovery equipment 11, the heater water temperature or the like.

Then, the heat amount determining unit 31 determines whether or not the heater core transferred heat amount is capable of following the target heat amount line (step S22). In this case, the heat amount determining unit 31 may determine whether or not the heater core transferred heat amount at the time when this determination is performed satisfies or is larger than the target value which corresponds to the time when this determination is performed and which is represented by the target heat amount line. When the heater core transferred heat amount satisfies or is larger than the target value, it may be determined that the heater core transferred heat amount is capable of following the target heat amount line. Alternatively, the heat amount determining unit 31 may determine whether or not a rate of a difference between the heater core transferred heat amount at the time when this determination is performed and the target value which corresponds to the time when this determination is performed and which is represented by the target heat amount line is smaller than a predetermined value. When the rate of the difference between the heater core transferred heat amount and the target value is smaller than the predetermined value, it may be determined that the heater core transferred heat amount is capable of following the target heat amount line.

Especially, in the step S22, it is preferable that the heat amount determining unit 31 determines whether or not the heater core transferred heat amount is capable of following the target heat amount line while maintaining a condition where the flow amount of the cooling water which passes through the heater core 12 is the minimum value and the flow amount adjusting valve 13 is closed (namely, the cooling water circulates in the bypass pipe and the cooling water remains in the main pipe and the sub pipe).

Incidentally, when the flow amount of the cooling water which passes through the heater core 12 is the minimum value and the flow amount adjusting valve 13 is closed, the heater core transferred heat amount is substantially equal to the heat amount which is recovered by the exhaust heat recovery equipment 11, if a loss which is caused by a heat radiation at the cooling water pipe 181b which connects the exhaust heat recovery equipment 11 and the heater core 12 is ignored. Therefore, the heat amount determining unit 31 determines whether or not the heater core transferred heat amount is capable of following the target heat amount line by using the heat amount which can be recovered by the exhaust heat recovery equipment 11 under the condition where the flow amount of the cooling water which passes through the heater core 12 is the minimum value and the flow amount adjusting valve 13 is closed. Incidentally, the heat amount which can be recovered by the exhaust heat recovery equipment 11 can be calculated on the basis of the flow amount of the cooling water which passes through the exhaust heat recovery equipment 11, a temperature of the exhaust gas or the like relatively easily.

As a result of the determination at the step S22, when it is determined that the heater core transferred heat amount is capable of following the target heat amount line (step S22: Yes), the flow amount adjusting unit 32 controls the flow amount adjusting valve 13 such that the flow amount adjusting valve 13 is closed (step S29). As a result, the cooling water circulates in the bypass pipe and the cooling water remains in the main pipe and the sub pipe. In addition, the flow amount adjusting unit 32 controls the electrical WP 16 to set the flow amount of the cooling water which the electrical WP 16 ejects to a minimum value (step S29). As a result, the flow amount of the cooling water which circulates in the bypass pipe is set to a minimum value.

On the other hand, as a result of the determination at the step S22, when it is determined that the heater core transferred heat amount is not capable of following the target heat amount line (step S22: No), an active operation for making the heater core transferred heat amount follow the target heat amount line is performed in the present embodiment. In the present embodiment, one of (i) a first operation which adjusts the flow amount of the cooling water which passes through the exhaust heat recovery equipment 11 (namely, the cooling water which circulates in the bypass pipe) while closing the flow amount adjusting valve 13, (ii) a second operation which adjusts the output of the engine 20 while closing the flow amount adjusting valve 13 and (iii) a third operation which makes the cooling water pass through not only the exhaust heat recovery equipment 11 but also the engine 20 (namely, a third operation which circulates the cooling water in the main pipe by opening the flow amount adjusting valve 13) is selectively performed as the operation for making the heater core transferred heat amount follow the target heat amount line.

When the flow amount of the cooling water which passes through the exhaust heat recovery equipment 11 is adjusted by the first operation, the heat amount which can be recovered by the exhaust heat recovery equipment 11 varies. As a result, the heater core transferred heat amount varies and thus heater core transferred heat amount is capable of following the target heat amount line.

When the output of the engine 20 is adjusted by the second operation, the temperature of the exhaust gas which is exhausted from the engine 20 varies. When the temperature of the exhaust gas which is exhausted from the engine 20 varies, the heat amount which can be recovered by the exhaust heat recovery equipment 11 varies. As a result, the heater core transferred heat amount varies and thus heater core transferred heat amount is capable of following the target heat amount line.

When the cooling water circulates in the main pipe by the third operation, not only the cooling water which passes through the exhaust heat recovery equipment 11 but also the cooling water which passes through the engine 20 flows into the heater core 12. Therefore, the heat amount is transferred to the heater core 12 from not only the cooling water which passes through the exhaust heat recovery equipment 11 but also the cooling water which passes through the engine 20. As a result, the heater core transferred heat amount varies and thus heater core transferred heat amount is capable of following the target heat amount line.

In order to select one of the three operation which is to be performed, the heater amount determining unit 31 determines whether or not the heater core transferred heat amount is capable of following the target heat amount line under a condition where the flow amount of the cooling water which passes through the heater core 12 is increased than the minimum value (furthermore, a condition where the flow amount adjusting valve 13 is closed) (step S23). In other words, the heat amount determining unit 31 determines whether or not an adjustment of the flow amount of the cooling water which passes through the heater core 12 (namely, an adjustment of the flow amount of the cooling water which is ejected from the electrical WP 16) allows the heater core transferred heat amount to follow the target heat amount line (step S23). Namely, the heat amount determining unit 31 determines whether or not the first operation allows the heater core transferred heat amount to follow the target heat amount line (step S23).

However, it is preferable that the heat amount determining unit 31 determine whether or not the heater core transferred heat amount is capable of following the target heat amount line while a deterioration of a fuel cost is suppressed as much as possible (in other words, is suppressed to the minimum). For example, it is preferable that the heat amount determining unit 31 select the operation by which the deterioration of the fuel cost is suppressed as much as possible (in other words, is suppressed to the minimum) among the above described three operations.

Figure 6:
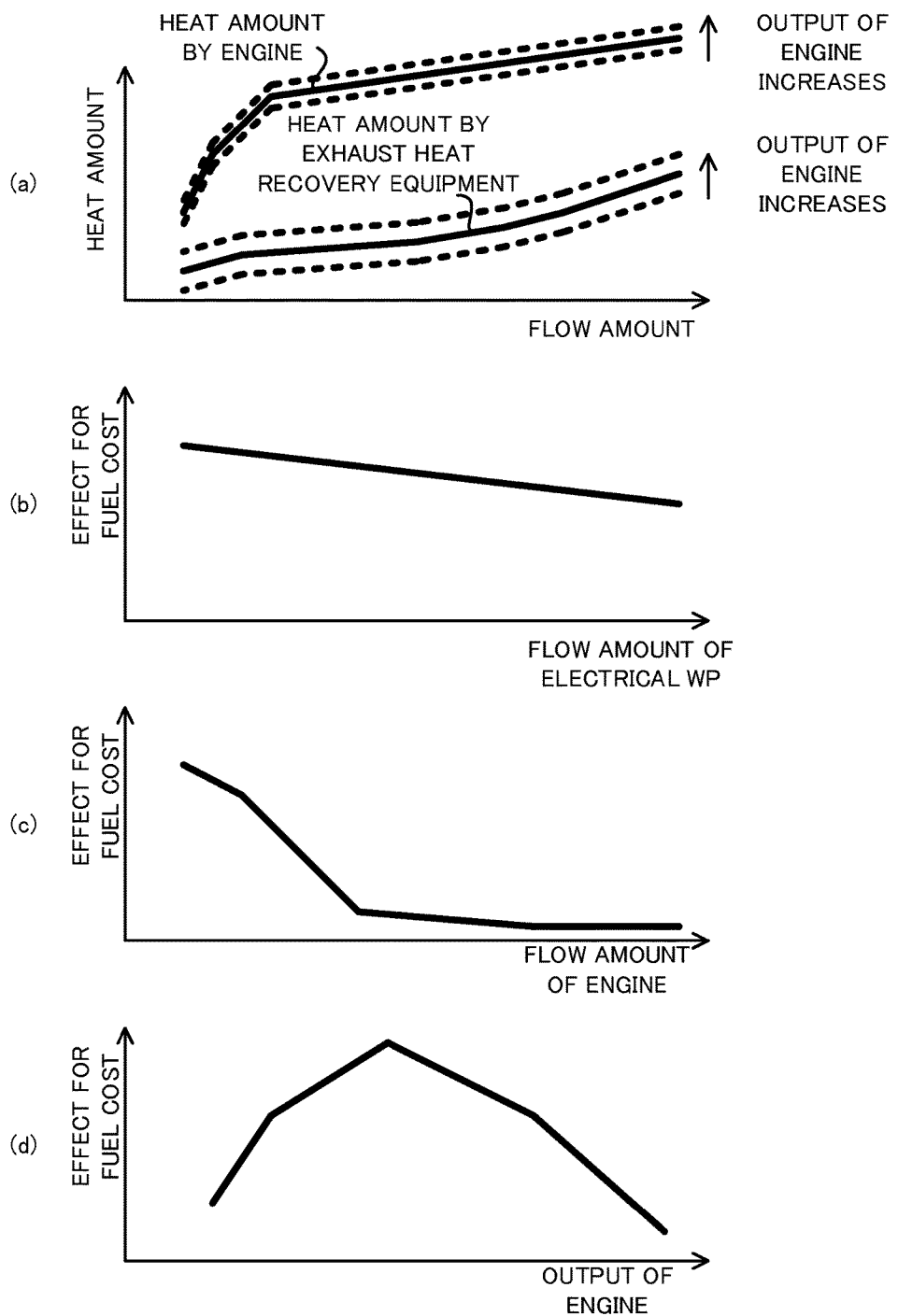
FIG. 6 are graphs illustrating a relationship between the flow amount of the cooling water and each of the heat amount which can be recovered from the cooling water which passes through the exhaust heat recovery equipment (namely, the cooling water which circulates in the bypass pipe) and the heat amount which can be recovered from the cooling water which passes through the engine (namely, the cooling water which circulates in the main pipe), a relationship between the flow amount of the cooling water which passes through the exhaust heat recovery equipment and the deterioration of the fuel cost, a relationship between the flow amount of the cooling water which passes through the engine and the deterioration of the fuel cost, and a relationship between the output of the engine and the deterioration of the fuel cost.

Here, with reference to FIG. 6, a relationship between the above described three operations and the deterioration of the fuel cost will be explained. FIG. 6 are graphs illustrating a relationship between the flow amount of the cooling water and each of the heat amount which can be recovered from the cooling water which passes through the exhaust heat recovery equipment 11 (namely, the cooling water which circulates in the bypass pipe) and the heat amount which can be recovered from the cooling water which passes through the engine 20 (namely, the cooling water which circulates in the main pipe), a relationship between the flow amount of the cooling water which passes through the exhaust heat recovery equipment 11 and the deterioration of the fuel cost, a relationship between the flow amount of the cooling water which passes through the engine 20 and the deterioration of the fuel cost, and a relationship between the output of the engine 20 and the deterioration of the fuel cost.

As illustrated in FIG. 6(*a*), when the flow amount of the cooling water which passes through the exhaust heat recovery equipment 11 increases, the heat amount which can be recovered from the cooling water which passes through the exhaust heat recovery equipment 11 also increases. Moreover, when the output of the engine 20 increases as illustrated by an arrow in FIG. 6(*a*), the heat amount which can be recovered from the cooling water (especially, same flow amount of the cooling water) which passes through the exhaust heat recovery equipment 11 also increases.

Similarly, when the flow amount of the cooling water which passes through the engine 20 increases, the heat amount which can be recovered from the cooling water which passes through the engine 20 also increases. Moreover, when the output of the engine 20 increases as illustrated by an arrow in FIG. 6(*a*), the heat amount which can be recovered from the cooling water (especially, same flow amount of the cooling water) which passes through the engine 20 also increases.

However, the heat amount which can be recovered from the cooling water which passes through the exhaust heat recovery equipment 11 is smaller than the heat amount which can be recovered from the cooling water which passes through the engine 20, under a condition where the flow amount of the cooling water which passes through the exhaust heat recovery equipment 11 is same as the flow amount of the cooling water which passes through the engine 20. Therefore, the heat amount determining unit 31 is capable of recognizing the heater core transferred heat amount relatively easily by properly setting the flow amount of the cooling water which passes through the exhaust heat recovery equipment 11, the flow amount of the cooling water which passes through the engine 20 and the output of the engine 20.

By the way, the increase of the flow amount of the cooling water which passes through the exhaust heat recover equipment 11 is typically realized by the increase of the flow amount of the cooling water which the electrical WP 16 ejects. The increase of the flow amount of the cooling water which the electrical WP 16 ejects results in an increase of an amount of the electrical power which is consumed by the electrical WP 16. The increase of an amount of the electrical power which is consumed by the electrical WP 16 results in the deterioration of the fuel cost of the vehicle 1. Namely, as illustrated in FIG. 6(*b*), the more the flow amount of the cooling water which the electrical WP 16 ejects is, the more the fuel cost of the vehicle 1 deteriorates.

On the other hand, when the cooling water passes through the engine 20, the warm-up of the engine 20 is interrupted. In other word, the warm-up of the engine 20 is interrupted due to an increase of the flow amount of the cooling water which passes through the engine 20. The interruption of the warm-up of the engine results in the deterioration of the fuel cost of the vehicle 1. Namely, as illustrated in FIG. 6(*c*), the more the flow amount of the cooling water which passes through the engine 20 is, the more the fuel cost of the vehicle 1 deteriorates.

On the other hand, the increase of the output of the engine 20 may result in the deterioration of the fuel cost of the vehicle 1. The reason is the following. Although the increase (namely, the adjustment) of the output of the engine 20 is performed mainly for the purpose of making the heater core transferred heat amount follow the target heat amount line in the present embodiment, an operating point of the engine 20 may be shifted from an optimum fuel cost output point by the adjustment of the output of the engine 20 for the above described purpose (however, it is preferable that the operating point of the engine 20 not be substantially or absolutely shifted from an optimum fuel cost output point). Typically, as illustrated in FIG. 6(*d*), the more the output of the engine 20 is shifter from an output corresponding to an optimum fuel cost line (an output corresponding to a peak of an effect for the fuel cost in FIG. 6(*d*)), the more the fuel cost of the vehicle 1 deteriorates.

Therefore, it is preferable that the heat amount determining unit 31 select the operation by which the deterioration of the total fuel cost, which reflecting the deterioration of the fuel cost caused by the adjustment of the flow amount of the cooling water which the electrical WP 16 ejects, the deterioration of the fuel cost caused by the adjustment of the flow amount of the cooling water which passes through the engine 20 and the deterioration of the fuel cost caused by the adjustment of the output of the engine 20, is suppressed as much as possible (preferably, the deterioration of the fuel cost is suppressed to the minimum or the fuel cost does not deteriorate) among the above described three operations. The heat amount determining unit 31 may refer to the graphs illustrated in FIG. 6(*a*) to FIG. 6(*d*) (alternatively, a function, a mapping, a formula or another information such as a table or the like).

Specifically, when only one of the (i) the first operation which increases the flow amount of the cooling water which passes through the exhaust heat recovery equipment 11, (ii) the second operation which adjusts the output of the engine 20 and (iii) the third operation which makes the cooling water pass through the engine 20 allows the heater core transferred heat amount to follow the target heat amount line, there is less necessity for considering the deterioration of the fuel cost. Therefore, the deterioration of the fuel cost is to be considered when at least two of the (i) the first operation which increases the flow amount of the cooling water which passes through the exhaust heat recovery equipment 11, (ii) the second operation which adjusts the output of the engine 20 and (iii) the third operation which makes the cooling water pass through the engine 20 allows the heater core transferred heat amount to follow the target heat amount line. For example, the case where each of the first operation and the third operation allows the heater core transferred heat amount to follow the target heat amount line will be explained. In this case, the flow amount of the cooling water which passes through the exhaust heat recovery equipment 11 (namely, the flow amount of the cooling water which allows the heater core transferred heat amount to follow the target heat amount line), in the case where the first operation for increasing the flow amount of the cooling water which passes through the exhaust heat recovery equipment 11 while closing the flow amount adjusting valve 13 is performed, is calculated on the basis of the graph illustrated in FIG. 6(*a*). As a result, a degree of the deterioration of the fuel cost, which is caused by the first operation for increasing the flow amount of the cooling water which passes through the exhaust heat recovery equipment 11 while closing the flow amount adjusting valve 13, is calculated on the basis of the graph illustrated in FIG. 6(*b*). Similarly, the flow amount of the cooling water which passes through the exhaust heat recovery equipment 11 and the flow amount of the cooling water which passes through the engine 20 (namely, the flow amount of the cooling water which allows the heater core transferred heat amount to follow the target heat amount line), in the case where the third operation which makes the cooling water pass through not only the exhaust heat recovery equipment 11 but also the engine 20, is calculated on the basis of the graph illustrated in FIG. 6(*a*). As a result, a degree of the deterioration of the fuel cost, which is caused by the third operation which makes the cooling water pass through not only the exhaust heat recovery equipment 11 but also the engine 20, is calculated on the basis of the graph illustrated in FIG. 6(*b*) and FIG. 6(*c*). The heat amount determining unit 31 is capable of selecting the operation by which the deterioration of the fuel cost is suppressed as much as possible (preferably, the deterioration of the fuel cost is suppressed to the minimum or the fuel cost does not deteriorate) by comparing the degrees of the fuel cost in both cases. It is possible to select the operation by which the deterioration of the fuel cost is suppressed as much as possible (preferably, the deterioration of the fuel cost is suppressed to the minimum or the fuel cost does not deteriorate) in the same manner in the case of another combination of operations.

Again in FIG. 3, as a result of the determination at the step S23, it is determined that the heater core transferred heat amount is capable of following the target heat amount line under the condition where the flow amount of the cooling water which passes through the heater core 12 is increased than the minimum value (step S23: Yes), the flow amount adjusting unit 32 controls the flow amount adjusting valve 13 such that the flow amount adjusting valve 13 is closed (step S28). However, it is preferably determined that the deterioration of the fuel cost caused by the first operation which increases the flow amount of the cooling water which passes through the exhaust heat recovery equipment 11 while closing the flow amount adjusting valve 13 be smaller than the deterioration of the fuel cost caused by the second operation which adjusts the output of the engine 20 and the deterioration of the fuel cost caused by the third operation which opens the flow amount adjusting valve 13, when the operation of the step S28 is performed. As a result, the cooling water circulates in the bypass pipe and the cooling water remains in the main pipe and the sub pipe.

In addition, the flow amount adjusting unit 32 controls the electrical WP 16 to increase (in other words, adjust) the flow amount of the cooling water which the electrical WP 16 ejects than the minimum value (step S28). In this case, it is preferable that the flow amount adjusting unit 32 increase the flow amount of the cooling water such that the heater core transferred heat amount follows the target heat amount line. Therefore, it is preferable that the flow amount adjusting unit 32 set the flow amount of the cooling water which the electrical WP 16 ejects on the basis of the target heat amount line which is set at the step S12 and the heater core transferred heat amount which is calculated at the step S21.

Incidentally, when the operation of the step S28 is performed, the flow amount adjusting valve 13 is closed. Therefore, the flow amount of the cooling water which the electrical WP 16 ejects is substantially same as the flow amount of the cooling water which circulates in the bypass pipe. Therefore, the flow amount adjusting unit 32 sets the flow amount of the cooling water which circulates in the bypass pipe on the basis of the target heat amount line.

Figure 7:
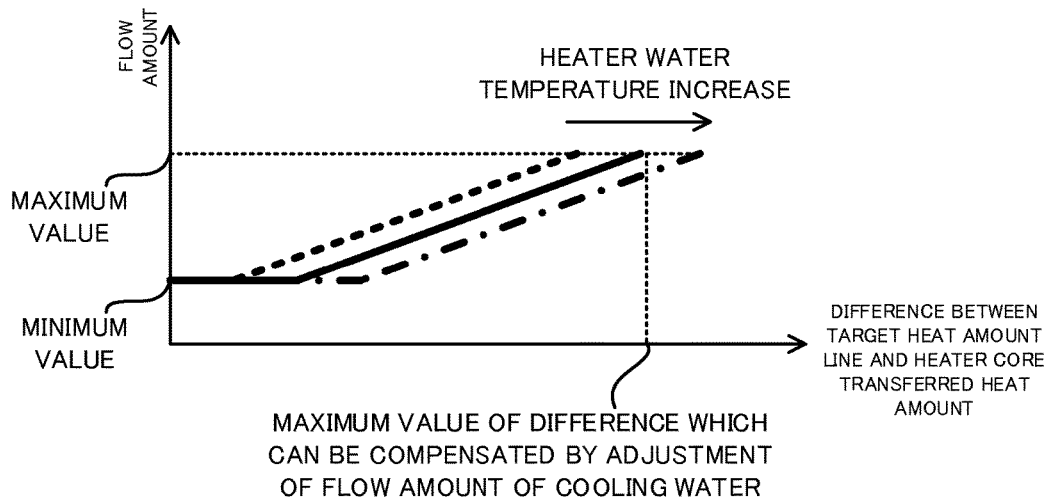
FIG. 7 is a graph illustrating the flow amount of the cooling water which the electrical WP should eject (in other words, the flow amount of the cooling water which should circulate in the bypass pipe) which is set such that the heater core transferred heat amount follows the target heat amount line.

Here, with reference to FIG. 7, one example of an operation of setting the flow amount of the cooling water which the electrical WP 16 ejects (in other words, the flow amount of the cooling water which circulates in the bypass pipe) such that the heater core transferred heat amount follows the target heat amount line. FIG. 7 is a graph illustrating the flow amount of the cooling water which the electrical WP 16 should eject (in other words, the flow amount of the cooling water which should circulate in the bypass pipe) which is set such that the heater core transferred heat amount follows the target heat amount line.

In order to make the heater core transferred heat amount to follow the target heat amount line, a heat amount which corresponds to a difference between the heater core transferred heat amount and the target heat amount line (specifically, the target value which is represented by the target heat amount line—heater core transferred heat amount) is compensated by the increase (in other words, the adjustment) of the flow amount of the cooling water which the electrical WP 16 should ejects. Therefore, as illustrated in FIG. 7, it is predicted that the heater core transferred heat amount is capable of following the target heat amount line, when the flow amount of the cooling water which the electrical WP 16 should ejects increases as the difference between the heater core transferred heat amount and the target heat amount line increases. Therefore, it is preferable that the flow amount adjusting unit 32 set the flow amount of the cooling water which the electrical WP 16 should ejects by referring to the graph illustrated in FIG. 7 (alternatively, a function, a mapping, a formula or another information such as a table or the like).

However, there is a maximum value of the flow amount of the cooling water which the electrical WP 16 ejects (in other words, the flow amount of the cooling water which circulates in the bypass pipe) in view of a specification of the electrical WP 16, a specification of the cooling apparatus 10 and the like. Namely, since the flow amount adjusting valve 13 is closed, an effect of the first operation, which makes the heater core transferred heat amount follow the target heat amount line by adjusting the flow amount of the cooling water which passes through the exhaust heat recovery equipment 11, is restricted. Namely, since the flow amount adjusting valve 13 is closed, when the difference is larger than a certain amount, it is difficult for only the first operation, which adjusts the flow amount of the cooling water which passes through the exhaust heat recovery equipment 11, to make the heater core transferred heat amount follow the target heat amount line. Therefore, in this case, the second operation, which adjusts the heat amount which can be recovered by the exhaust heat recovery equipment 11 by adjusting the output of the engine 20, is performed to make the heater core transferred heat amount follow the target heat amount line. Alternatively, in this case, the third operation, which uses not only the heat of the cooling water which flows into the heater core 12 via the exhaust heat recovery equipment 11 but also the heat of the cooling water which flows into the heater core 12 via the engine 20, is performed to make the heater core transferred heat amount follow the target heat amount line.

Incidentally, when the heater water temperature varies, the relationship between the flow amount of the cooling water and the difference between the heater core transferred heat amount and the target heat amount line also varies. For example, when the heater water temperature increases, the heat amount which can be recovered from the same flow amount of cooling water increases. Namely, when the heater water temperature increases, the flow amount of the cooing water which is required to make same heater core transferred heat amount follow same target heat amount line decreases. As a result, when the heater water temperature increases, the relationship between the flow amount of the cooling water and the difference between the heater core transferred heat amount and the target heat amount line moves to a relative right side as illustrated by a dashed-dotted line in FIG. 7. On the other hand, when the heater water temperature decreases, the heat amount which can be recovered from the same flow amount of cooling water decreases. Namely, when the heater water temperature decreases, the flow amount of the cooing water which is required to make same heater core transferred heat amount follow same target heat amount line increases. As a result, when the heater water temperature decreases, the relationship between the flow amount of the cooling water and the difference between the heater core transferred heat amount and the target heat amount line moves to a relative left side as illustrated by a dashed line in FIG. 7.

Incidentally, each of the second operation which adjusts the output of the engine 20 and the third operation which makes the cooling water pass through the engine 20 corresponds to an operation which adjusts the heater water temperature. Therefore, each of the second operation and the third operation makes the heater core transferred heat amount follow the target heat amount line by using the relationship which is illustrated by the dashed-dotted line or the dashed line in FIG. 7.

Again in FIG. 3, as a result of the determination at the step S23, when it is determined that the heater core transferred heat amount is not capable of following the target heat amount line under the condition where the flow amount of the cooling water which passes through the heater core 12 is increased than the minimum value (step S23: No), the output adjusting unit 33 performs the second operation which adjusts the output of the engine 20 to make the heater core transferred heat amount follow the target heat amount line. Alternatively, as a result of the determination at the step S23, even when it is determined that the heater core transferred heat amount is capable of following the target heat amount line under the condition where the flow amount of the cooling water which passes through the heater core 12 is increased than the minimum value, when it is determined that the deterioration of the fuel cost caused by the first operation which increases the flow amount of the cooling water which passes through the exhaust heat recovery equipment 11 while closing the flow amount adjusting valve 13 is larger than the deterioration of the fuel cost caused by the second operation which adjusts the output of the engine 20, the output adjusting unit 33 may perform the second operation which adjusts the output of the engine 20 to make the heater core transferred heat amount follow the target heat amount line Incidentally, when the second operation is performed, the flow amount adjusting unit 32 adjusts the open degree of the valve element of the flow amount adjusting valve 13 and the flow amount of the cooling water which the electrical WP 16 ejects such that the flow amount of the cooling water which passes through the cooling water pipe 181*a*, the cooling water pipe 182*a* and the cooling water pipe 182*c* which form the bypass pipe (namely, substantially, the flow amount of the cooing water which passes through the exhaust heat recovery equipment 11) does not decrease. Especially, it is preferable that the flow amount adjusting unit 32 adjust the open degree of the valve element of the flow amount adjusting valve 13 and the flow amount of the cooling water which the electrical WP 16 ejects such that the flow amount of the cooling water which passes through the cooling water pipe 181*a*, the cooling water pipe 182*a* and the cooling water pipe 182*c* which form the bypass pipe (namely, substantially, the flow amount of the cooing water which passes through the exhaust heat recovery equipment 11) is maintained at the maximum value.

In this case, since the heater core transferred heat amount is not capable of following the target heat amount line (namely, the heater core transferred heat amount is less than the target heat amount line), the output adjusting unit 33 typically increases the output of the engine 20. As a result, the temperature of the exhaust gas which is exhausted from the engine 20 increases. When the temperature of the exhaust gas which is exhausted from the engine 20 increases, the heat amount which can be recovered by the exhaust heat recovery equipment 11 increases. Therefore, even when the heater core transferred heat amount is not capable of following the target heat amount line by only the first operation, the heater core transferred heat amount is capable of following the target heat amount line.

In order to make the heater core transferred heat amount to follow the target heat amount line, a heat amount which corresponds to the difference between the heater core transferred heat amount and the target heat amount line (specifically, the target value which is represented by the target heat amount line—heater core transferred heat amount) is compensated by the increase of the temperature of the exhausted gas which is caused by the increase of the output of the engine 20. Therefore, it is predicted that the heater core transferred heat amount is capable of following the target heat amount line, when the output of the engine 20 increases as the difference between the heater core transferred heat amount and the target heat amount line increases.

However, the driver may experience an uncomfortable feeling (for example, a deterioration of a drive quality) which is caused by the adjustment of the output of the engine 20. Thus, the output adjusting unit 33 may restrict an increasing amount of the output of the engine 20 to the minimum, in view of suppressing or eliminating the uncomfortable feeling which the driver experiences. For example, the output adjusting unit 33 may increase the output of the engine 20 by an increasing amount by which an influence to the drive quality of the driver is within an allowable range, by considering a relationship between the increasing amount of the output of the engine 20 and a variation of the drive quality which is caused by the increase of the output of the engine 20. As a result, the uncomfortable feeling which the driver experiences is suppressed or eliminated compared to the case where the increasing amount of the output of the engine 20 is not restricted to the minimum.

In addition, it is preferable that the output adjusting unit 33 maintain the increasing amount (alternatively, an adjustment amount) of the output of the engine 20 during a period when the operation for increasing (alternatively, adjusting) the output of the engine 20 is continued to be performed, in view of suppressing or eliminating the uncomfortable feeling which the driver experiences. Namely, it is preferable that the output adjusting unit 33 not vary the increasing amount of the output of the engine during the period when the operation for increasing the output of the engine 20 is continued to be performed. As a result, the uncomfortable feeling which the driver experiences is suppressed or eliminated compared to the case where the increasing amount of the output of the engine 20 varies.

However, there is a possibility that the heater core transferred heat amount is not capable of following the target heat amount line by only the second operation which adjusts the output of the engine 20, when the adjustment amount of the output of the engine 20 is restricted to the minimum or is maintained. However, as described above, the third operation, which makes the cooling water pass through not only the exhaust heat recovery equipment 11 but also the engine 20, allows the heater core transferred heat amount to follow the target heat amount line.

Incidentally, the adjustment amount of the output of the engine 20 may be set depending on a driving mode which is desired by the driver. For example, when the driver desires a driving mode by which the drive quality (for example, a NV (Noise Vibration) characteristic) is prioritized, the output adjusting unit 33 may restrict the adjustment amount of the output of the engine 20 to the minimum. Similarly, when the driver desires the driving mode by which the drive quality is prioritized, the output adjusting unit 33 may maintain the adjustment amount of the output of the engine 20.

Moreover, when the SOC of the battery 500 is small (for example, the SOC is equal to or smaller than a predetermined threshold value), the output of the engine 20 sometimes increases for charging the battery 500. Therefore, when the SOC of the battery 500 is small, the increase of the output of the engine 20 achieves two effect of the charge of the battery 500 and the increase of the heater core transferred heat amount. Therefore, in this case, the output adjusting unit 33 actively adjust the output of the engine 20. Namely, the output adjusting unit 33 may increase the output of the engine 20 by an increasing amount which is required for an appropriate charge of the battery 500, instead of restricting the adjustment amount of the output of the engine 20 to the minimum.

The output adjusting unit 33 may adjust the output of the engine 20 (=a rotational number×a torque) by adjusting at least one of the rotational number and the torque of the engine 20. However, it is preferable that the output adjusting unit 33 adjust the output of the engine 20 by adjusting the torque of the engine 20 while maintaining the rotational number of the engine 20, because the driver may experience the uncomfortable feeling which is caused by the adjustment of the output of the engine 20. The uncomfortable feeling which the driver experiences can be suppressed or eliminated when the output of the engine 20 is adjusted by adjusting the torque of the engine 20, compared to the case where the output of the engine 20 is adjusted by adjusting the rotational number of the engine 20.

In the present embodiment, since the hybrid vehicle 1 has the cooling apparatus 10, it is preferable that the output adjusting unit 33 adjust the output of the engine 20 while properly adjusting a ratio of the driving power which the engine 20 outputs and the driving power which at least one of the motor generators MG1 and MG2 outputs. Specifically, it is preferable that the output adjusting unit 33 adjust the output of the engine 20 without influencing the driving of the hybrid vehicle 1.

Figure 8:
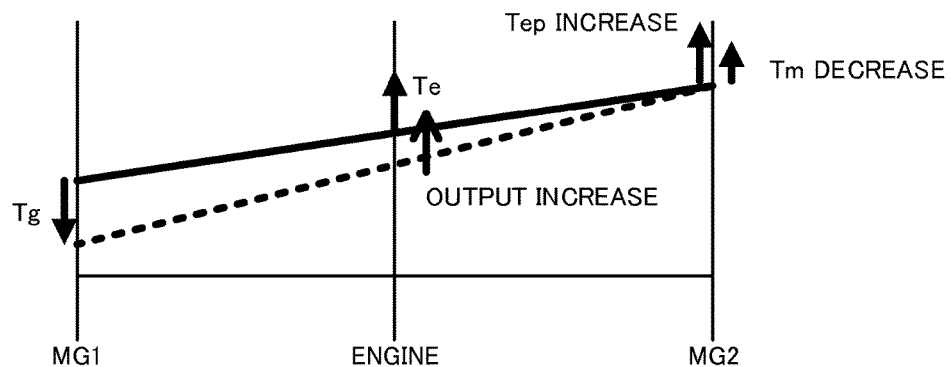
FIG. 8 is an operational alignment chart illustrating the output (namely, a ratio of outputting the driving power) of each of the motor generators and engine.

Here, with reference to FIG. 8, an aspect of adjusting the output of the engine 20 without influencing the driving of the hybrid vehicle 1 will be explained. FIG. 8 is an operational alignment chart illustrating the output (namely, a ratio of outputting the driving power) of each of the motor generators MG1 and MG2 and engine 20.

As illustrated in FIG. 8, it is preferable that a vehicle speed of the hybrid vehicle 1 be maintained not to influence the driving of the hybrid vehicle 1. It is preferable that a rotational number of the motor generator MG2 which is directly coupled with the axle shaft 11 be maintained to maintain the vehicle speed of the hybrid vehicle 1. Therefore, in an example illustrated in FIG. 8, the output adjusting unit 33 adjusts the rotational number of the engine 20 and a rotational number of the motor generator MG1 while maintaining the rotational number of the motor generator MG2. As a result, the output adjusting unit 33 is capable of adjusting the output of the engine 20 without influencing the driving of the hybrid vehicle 1.

Incidentally, as described above, the increase of the flow amount of the cooling water which the electrical WP 16 ejects results in the deterioration of the fuel cost of the hybrid vehicle 1. On the other hand, the adjustment of the output of the engine 20 also results in the deterioration of the fuel cost of the hybrid vehicle 1. Therefore, it is preferable that the flow amount adjusting unit 32 adjust the flow amount of the cooling water which the electrical WP 16 ejects and the output adjusting unit 33 adjust the output of the engine 20 such that the deterioration of the total fuel cost, which reflecting the deterioration of the fuel cost caused by the first operation which adjusts the flow amount of the cooling water which the electrical WP 16 ejects and the deterioration of the fuel cost caused by the second operation which adjusts the output of the engine 20, is suppressed as much as possible (preferably, is suppressed to the minimum).

Again in FIG. 3, then, the heat amount determining unit 31 determines whether or not the heater core transferred heat amount is capable of following the target heat amount line (namely, the heater core transferred heat amount is not less than the target heat amount line) as a result of the adjustment of the output of the engine 20 (step S25).

As a result of the determination at the step S25, when it is determined that the heater core transferred heat amount is capable of following the target heat amount line as a result of the adjustment of the output of the engine 20 (step S25: Yes), ECU 30 ends a series of operations from the step S21 to the step S29. In this case, it is preferable that the ECU 30 repeatedly perform the series of operations from the step S21 to the step S29 at a desired timing during the period before the blowing start time.

On the other hand, as a result of the determination at the step S25, when it is determined that the heater core transferred heat amount is not capable of following the target heat amount line as a result of the adjustment of the output of the engine 20 (step S25: No), the flow amount adjusting unit 32 performs the third operation which makes the cooling water pass through not only the exhaust heat recovery equipment 11 but also the engine 20. Alternatively, even when it is determined that the heater core transferred heat amount is capable of following the target heat amount line as a result of the adjustment of the output of the engine 20, when it is determined that the deterioration of the fuel cost caused by the second operation which adjusts the output of the engine 20 is larger than the deterioration of the fuel cost caused by the third operation which opens the flow amount adjusting valve 13, the flow amount adjusting unit 32 may perform the third operation which makes the cooling water pass through not only the exhaust heat recovery equipment 11 but also the engine 20 instead of the output adjusting unit 33 performing the second operation which adjusts the output of the engine 20.

For this, firstly, the heat amount determining unit 31 obtains the engine water temperature (namely, the water temperature of the cooling water which passes through the engine 20) by referring to the measuring result of the water temperature sensor 17b (step S26).

Then, the flow amount adjusting unit 32 controls the flow amount adjusting valve 13 such that the flow amount adjusting valve 13 is opened (step S27). As a result, the cooling water circulates in the bypass pipe and the cooling water circulates in the main pipe.

Figure 9:
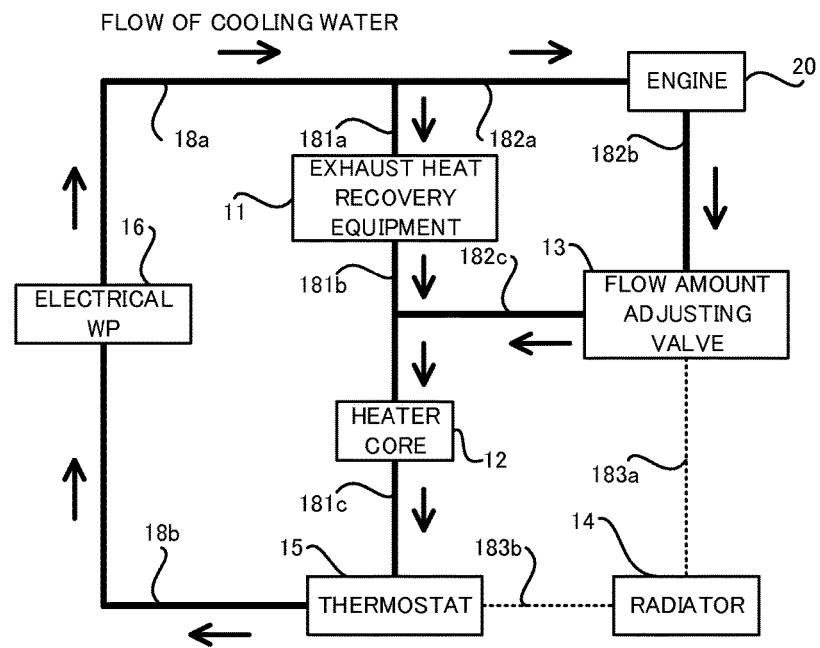
FIG. 9 is a block diagram illustrating the circulation aspect of the cooling water when the flow amount adjusting valve is opened.

Here, with reference to FIG. 9, a circulation aspect of the cooling water when the flow amount adjusting valve 13 is opened. FIG. 9 is a block diagram illustrating the circulation aspect of the cooling water when the flow amount adjusting valve 13 is opened.

As illustrated in FIG. 9, when the flow amount adjusting valve 13 is opened, the flow of the cooling water from the cooling water pipe 182b to the cooling water pipe 182c and the flow of the cooling water from the cooling water pipe 182b to the cooling water pipe 183a is allowed. Thus, the cooling water circulates in the cooling water pipe 182a, the cooling water pipe 182b and the cooling water pipe 182c which form the main pipe. Moreover, when the thermostat 15 is opened, the cooling water circulates in the cooling water pipe 183a and the cooling water pipe 183b which form the sub pipe. However, FIG. 9 illustrates a condition where the thermostat 15 is closed (namely, the cooling water remains in the cooling water pipe 183a and the cooling water pipe 183b which form the sub pipe). Moreover, the cooling water circulates in the cooling water pipe 18a, the cooling water pipe 181a, the cooling water pipe 181b, the cooling water pipe 181c and the cooling water pipe 18b which form the bypass pipe. Incidentally, the arrows in FIG. 9 illustrate the flowing direction of the cooling water.

Again in FIG. 3, in addition, the flow amount adjusting unit 32 controls the flow amount adjusting valve 13 to adjust the open degree of the valve element of the flow amount adjusting valve 13 (step S27). Namely, the flow amount adjusting unit 32 adjusts the flow amount of the cooling water which circulates in the main pipe (in other words, the flow amount of the cooling water which passes through the engine 20) by adjusting the open degree of the valve element of the flow amount adjusting valve 13. In addition, the flow amount adjusting unit 32 controls the electrical WP 16 to adjust the flow amount of the cooling water which the electrical WP 16 ejects (step S27). Namely, the flow amount adjusting unit 32 adjusts the flow amount of the cooling water which circulates in the bypass pipe (in other words, the flow amount of the cooling water which passes through the exhaust heat recovery equipment 11) and the flow amount of the cooling water which circulates in the main pipe (in other words, the flow amount of the cooling water which passes through the engine 20) by adjusting the flow amount of the cooling water which the electrical WP 16 ejects.

In this case, the flow amount adjusting unit 32 adjusts the open degree of the valve element of the flow amount adjusting valve 13 and the flow amount of the cooling water which the electrical WP 16 ejects such that the flow amount of the cooling water which passes through the cooling water pipe 181a, the cooling water pipe 182a and the cooling water pipe 182c which form the bypass pipe (namely, substantially, the flow amount of the cooing water which passes through the exhaust heat recovery equipment 11) does not decrease. Especially, it is preferable that the flow amount adjusting unit 32 adjust the open degree of the valve element of the flow amount adjusting valve 13 and the flow amount of the cooling water which the electrical WP 16 ejects such that the flow amount of the cooling water which passes through the cooling water pipe 181a, the cooling water pipe 182a and the cooling water pipe 182c which form the bypass pipe (namely, substantially, the flow amount of the cooing water which passes through the exhaust heat recovery equipment 11) is maintained at the maximum value.

Furthermore, the flow amount adjusting unit 32 adjusts the open degree of the valve element of the flow amount adjusting valve 13 and the flow amount of the cooling water which the electrical WP 16 ejects such that the heater core transferred heat amount follows the target heat amount line. Therefore, it is preferable that the flow amount adjusting unit 32 set the open degree of the valve element of the flow amount adjusting valve 13 and the flow amount of the cooling water which the electrical WP 16 ejects on the basis of the target heat amount line which is set at the step S12, the heater core transferred heat amount which is calculated at the step S21, the adjustment amount of the output of the engine 20 which is adjusted at the step S24 and the engine water temperature which is obtained at the step S26.

Moreover, when the third operation by which the cooling water circulates in the bypass pipe, the output adjusting unit 33 may cancel (namely, stop) the adjustment of the output of the engine 20 which is performed at the step S24. Alternatively, the output adjusting unit 33 may continue to perform the adjustment of the output of the engine 20 which is performed at the step S24. When the output adjusting unit 33 may continue to perform the adjustment of the output of the engine 20, it is preferable that the output adjusting unit 33 set the adjustment amount of the output of the engine 20 on the basis of the target heat amount line which is set at the step S12, the heater core transferred heat amount which is calculated at the step S21, the adjustment amount of the output of the engine 20 which is adjusted at the step S24, the engine water temperature which is obtained at the step S26 and the open degree of the valve element of the flow amount adjusting valve 13 and the flow amount of the cooling water ejected by the electrical WP 16 which are set at the step S27.

Incidentally, in the present embodiment, as described above, the flow amount of the cooling water which passes through the exhaust heat recovery equipment 11 is maintained at the maximum value. Namely, the heat amount which is transferred to the heater core 12 from the cooling water which flows into the heater core 12 via the exhaust heat recovery equipment 11 is maintained at the maximum value. Thus, the heat amount which is transferred to the heater core 12 from the cooling water which flows into the heater core 12 via the engine 20 for making the heater core transferred heat amount follow the target heat amount line is minimized. Namely, the flow amount of the cooling water which passes through the engine 20 is minimized. It is preferable that the flow amount adjusting unit 32 adjust the open degree of the valve element of the flow amount adjusting valve 13 and the flow amount of the cooling water which the electrical WP 16 ejects in view of the above described explanation.

However, it is preferable that the flow amount of the cooling water which flows into the heater core 12 via the engine 20 not be larger than a predetermined upper limit value which is set in view of minimizing the deterioration of the fuel cost, which is caused by the increase of the flow amount of the cooling water which passes through the engine 20, as much as possible.

Incidentally, as described above, the increase of the flow amount of the cooling water which the electrical WP 16 ejects results in the deterioration of the fuel cost of the vehicle 1. On the other hand, the increase of the flow amount of the cooling water which passes through the main pipe (namely, the cooling water which passes through the engine 20) also results in the deterioration of the fuel cost of the vehicle 1. Therefore, it is preferable that the flow amount adjusting unit 32 adjust the open degree of the valve element of the flow amount adjusting valve 13 and the flow amount of the cooling water which the electrical WP 16 ejects such that the deterioration of the total fuel cost, which reflecting the deterioration of the fuel cost caused by the increase of the flow amount of the cooling water which the electrical WP 16 ejects and the deterioration of the fuel cost caused by the increase of the flow amount of the cooling water which passes through the main pipe (namely, the cooling water which passes through the engine 20), is suppressed as much as possible (preferably, is suppressed to the minimum).

Moreover, in the above described explanation, the third operation which makes the cooling water pass through the engine 20 is performed, when the heater core transferred heat amount is not capable of following the target heat amount line as a result of the adjustment of the output of the engine 20. However, as described above, the driver may experience the uncomfortable feeling which is caused by the adjustment of the output of the engine 20. Therefore, even when the heater core transferred heat amount is capable of following the target heat amount line as a result of the adjustment of the output of the engine 20, the third operation which makes the cooling water pass through the engine 20 may be performed instead of the second operation which adjusts the output of the engine 20, if it is desired not to make the driver experience the excessive uncomfortable feeling which is caused by the adjustment of the output of the engine 20.

Figure 10:
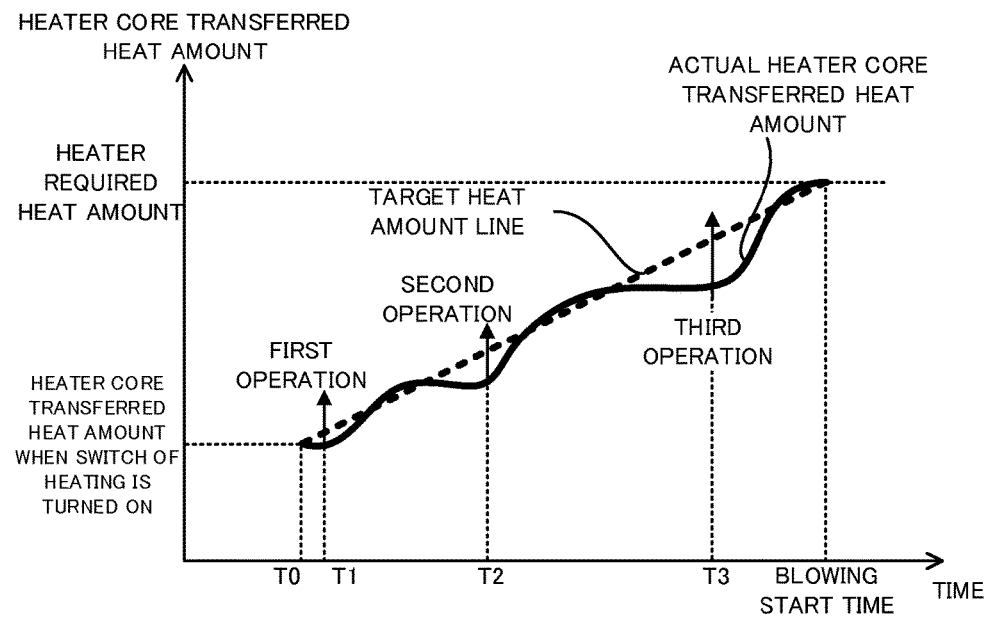
FIG. 10 is a graph illustrating the specific example of the operation for making the heater core transferred heat amount follow the target heat amount line.

Moreover, when the engine 20 is warmed-up by a certain degree (for example, a predetermined time has passed since a start of the engine 20), the deterioration of the fuel cost which is caused by the passing of the cooling water is smaller even when the cooling water passes through the engine 20. Therefore, even when the heater core transferred heat amount is capable of following the target heat amount line as a result of the adjustment of the output of the engine 20, when the engine 20 is warmed-up by a certain degree, the third operation which makes the cooling water pass through the engine 20 may be performed instead of the second operation which adjusts the output of the engine 20, Here, with reference to FIG. 10, a specific example of the operation for making the heater core transferred heat amount follow the target heat amount line will be explained. FIG. 10 is a graph illustrating the specific example of the operation for making the heater core transferred heat amount follow the target heat amount line.

As illustrated in FIG. 10, for example, the switch of the heating or the like is turned on at a time T0. Therefore, the target heat amount line (see a dashed line in FIG. 10) which extends from the point which corresponds to the heater core transferred heat amount at the time T0 to the point which corresponds to the heater required heat amount at the blowing star time is set.

Then, it is assumed to be determined that the heater core transferred heat amount is not capable of following the target heat amount line while maintaining the condition where the flow amount of the cooling water which passes through the heater core 12 is the minimum value and the flow amount adjusting valve 13 is closed at a time T1 (step S22 in FIG. 3: No). In this case, moreover, it is assumed to be determined that the heater core transferred heat amount is capable of following the target heat amount line under the condition where the flow amount of the cooling water which passes through the heater core 12 is increased than the minimum value (step S23 in FIG. 3: Yes). As a result, the first operation which adjusts the flow amount of the cooling water which passes through the exhaust heat recovery equipment 11 while closing the flow amount adjusting valve 13 is performed at the time T1 (step S28 in FIG. 3). As a result, as illustrated in FIG. 10, the heater core transferred heat amount increases by an amount which corresponds to the adjustment amount of the flow amount of the cooling water which passes through the exhaust heat recovery equipment 11. Namely, the heater core transferred heat amount is adjusted to follow the target line.

Then, it is assumed to be determined that the heater core transferred heat amount is not capable of following the target heat amount line under the condition where the flow amount of the cooling water which passes through the heater core 12 is increased than the minimum value at a time T2 (step S23 in FIG. 3: No). As a result, the second operation which adjusts the output of the engine 20 is performed at the time T2 (step S24 in FIG. 3). As a result, as illustrated in FIG. 10, the heater core transferred heat amount increases by an amount which corresponds to the adjustment amount of the output of the engine 20. Namely, the heater core transferred heat amount is adjusted to follow the target line.

Then, it is assumed to be determined that the heater core transferred heat amount is not capable of following the target heat amount line as a result of the adjustment of the output of the engine 20 at a time T3 (step S25 in FIG. 3: No). As a result, the third operation which makes the cooling water pass thorough not only the exhaust heat recovery equipment 11 but also the engine 20 is performed at the time T3 (step S27 in FIG. 3). As a result, as illustrated in FIG. 10, the heater core transferred heat amount increases by an amount which corresponds to the flow amount of the cooling water which passes through the engine 20. Namely, the heater core transferred heat amount is adjusted to follow the target line.

As described above, according to the present embodiment, the flow amount adjusting valve 13 is closed when the heater request is not instructed. As a result, the cooling water circulates in the bypass pipe and the cooling water remains in the main pipe and the sub pipe. Thus, the heating of the cooling water which remains in the water jacket of the engine 20 is facilitated (in other words, the cooling of the cooling water is inhibited), compared to the case where the cooling water circulates in at least one of the main pipe and the sub pipe (namely, the case where the cooling water passes through the water jacket of the engine 20). As a result, the warm-up of the engine 20 is facilitated. Therefore, the deterioration of the fuel cost which is caused by the cooling water passing through the engine 20 is suppressed.

Moreover, the flow amount adjusting valve 13 is also closed, when the heater request is instructed and the heater core transferred heat amount is capable of following the target heat amount line under the condition where the flow amount of the cooling water which passes through the heater core 12 is the minimum value. As a result, the cooling water circulates in the bypass pipe and the cooling water remains in the main pipe and the sub pipe. Therefore, the deterioration of the fuel cost which is caused by the cooling water passing through the engine 20 is suppressed. In addition, since the heater core transferred heat amount is capable of following the target heat amount line, the desired intensity of the heating or the like (for example, the heater, the defroster, the deice or the like) which is required by the heater request can be appropriately performed immediately after the blowing star time.

Moreover, the flow amount adjusting valve 13 is also closed, when the heater request is instructed and the increase of the flowing amount of the cooling water which the electrical WP 16 ejects (namely, the increase than the minimum value and corresponding to the first operation) allows the heater core transferred heat to follow the target heat amount line. As a result, the cooling water circulates in the bypass pipe and the cooling water remains in the main pipe and the sub pipe. Therefore, the deterioration of the fuel cost which is caused by the cooling water passing through the engine 20 is suppressed. In addition, since the heater core transferred heat amount is capable of following the target heat amount line, the desired intensity of the heating or the like (for example, the heater, the defroster, the deice or the like) which is required by the heater request can be appropriately performed immediately after the blowing star time even in this case.

On the other hand, the flow amount adjusting valve 13 is also closed, when the heater request is instructed and the adjustment of the output of the engine 20 (namely, corresponding to the second operation) allows the heater core transferred heat to follow the target heat amount line. As a result, the cooling water circulates in the bypass pipe and the cooling water remains in the main pipe and the sub pipe. Therefore, the deterioration of the fuel cost which is caused by the cooling water passing through the engine 20 is suppressed. In addition, since the heater core transferred heat amount is capable of following the target heat amount line, the desired intensity of the heating or the like (for example, the heater, the defroster, the deice or the like) which is required by the heater request can be appropriately performed immediately after the blowing star time even in this case.

On the other hand, the flow amount adjusting valve 13 is opened (namely, the cooling water flows into the engine 20), only when the heater request is instructed and the increase of the flowing amount of the cooling water which the electrical WP 16 ejects (namely, the increase than the minimum value) and the adjustment of the output of the engine 20 do not allow the heater core transferred heat to follow the target heat amount line. Even in this case, the flow amount of the cooing water which passes through the exhaust heat recovery equipment 11 does not decrease (typically, it is maintained at the maximum value). Namely, the heat amount which is transferred to the heater core 12 from the cooing water which passes through the exhaust heat recovery equipment 11 does not decrease (typically, it is maintained at the maximum value). Thus, the heat amount which should be outputted, as the heat amount which should be transferred to the heater core 12 to make the heater core transferred heat amount follow the target heat amount line, from the cooling water passing thorough the engine 20 is minimized. Namely, the flow amount of the cooling water which passes through the engine 20 is minimized even when the flow amount adjusting valve 13 is opened. Therefore, the deterioration of the fuel cost which is caused by the opening of the flow amount adjusting valve 13 (namely, cooling water flowing into the engine 20) is minimized even when the flow amount adjusting valve 13 is opened.

Especially, in the present embodiment, the second operation which adjusts the output of the engine 20 makes the heater core transferred heat amount follow the target heat amount line before the third operation which opens the flow amount adjusting valve 13 (namely, which makes the cooling water flow into the engine 20) is performed. Therefore, the deterioration of the fuel cost which is caused by the cooling water passing through the engine 20 is appropriately suppressed, because the circulation of the cooling water in the main pipe which passes through the engine 20 is prevented as much as possible.

As described above, in the present embodiment, the flow amount adjusting valve 13 is closed as a general rule when the engine 20 is warmed-up, even when the heater request is instructed. However, in the present embodiment, the flow amount adjusting valve 13 is opened in a limited manner while the flow amount of the cooling water in the bypass pipe which does not pass through the engine 20 is maintained, when the heater core transferred heat amount is not capable of following the target heat amount line under the condition where the flow amount adjusting valve 13 is closed. As a result, in the present embodiment, the circulation of the cooling water in the main pipe which passes through the engine 20 is suppressed as much as possible, and the flow amount of the cooling water in the main pipe which passes through the engine 20 is minimized as much as possible even when the cooling water has to circulate in the main pipe which passes through the engine 20. In other words, in the present embodiment, the circulation of the cooling water in the main pipe which passes through the engine 20 is suppressed as much as possible, and the flow amount of the cooling water in the main pipe which passes through the engine 20 is minimized as much as possible even when the cooling water has to circulate in the main pipe which passes through the engine 20, for the principle purpose of suppressing the deterioration of the fuel cost as much as possible. Therefore, the deterioration of the fuel cost is appropriately suppressed.

However, as described above, it is preferable that the second operation which adjusts the output of the engine 20 be prioritized over the third operation which makes the cooling water pass through the engine 20, when suppressing the deterioration of the fuel cost is the principle purpose. On the other hand, as described above, the driver may experience the uncomfortable feeling (namely, the deterioration of the drive quality) which is caused by the adjustment of the output of the engine 20. Therefore, the third operation which makes the cooling water pass through the engine 20 may be actively performed while the adjustment amount of the output of the engine 20 by the second operation is minimized, when suppressing the uncomfortable feeling which the driver experiences is the principle purpose. As a result, the uncomfortable feeling which the driver experiences is suppressed or eliminated.

In addition, in the present embodiment, the heater core transferred heat amount is adjusted on the basis of the target heat amount line which represents not only the heater core required heat amount which corresponds to the final target value but also the transitional target value before reaching the final target value. Here, in a cooling water control apparatus in a comparative example which makes the heater core transferred heat amount rapidly become to be equal to the heater core required heat amount, there is a possibility that the adjustment amount (for example, the adjustment amount per unit time) of the output of the engine 20 is relatively large to make the heater core transferred heat amount become to be equal to the heater core required heat amount. As a result, the driver may experience the large uncomfortable feeling due to the large adjustment amount of the output of the engine 20. However, in the present embodiment, the heater core transferred heat amount is adjusted by the adjustment of the output of the engine and the like on the basis of the target heat amount line which represents the transitional target value before reaching the final target value. Thus, the heater core transferred heat gradually increase while the adjustment amount of the output of the engine 20 is reduced, compared to the cooling water control apparatus in the comparative example. As a result, the heater core transferred heat amount is capable of following the target heat amount line and finally the heater core transferred heat amount is capable of being equal to the heater core required heat amount at the blowing start time. Therefore, the uncomfortable feeling of the driver can be suppressed or eliminated, because the adjustment amount of the output of the engine 20 is reduced.

Furthermore, in the cooling water control apparatus in the comparative example, there is a possibility that the third operation, which opens the flow amount adjusting valve 13 (namely, makes the cooling water flow into the engine 20), is performed at a highly probability to make the heater core transferred heat amount rapidly become to be equal to the heater core required heat amount. The reason is that the heater core transferred heat amount rapidly becomes to be equal to the heater core required heat amount by using the cooling water which passes through the engine 20, because the heat amount which is transferred to the heater core from the cooling water passing through the engine 20 is larger than the heat amount which is transferred to the heater core from the cooling water passing through the exhaust heat recovery equipment 11 as illustrated in FIG. 6(*a*). However, in the present embodiment, since it is enough for the heater core transferred heat amount to gradually increase to reach the heater core required heat amount, there is less possibility that the third operation which makes the cooling water flow into the engine 20 is performed at the highly probability. Therefore, the uncomfortable feeling of the driver can be suppressed or eliminated and the deterioration of the fuel cost which is caused by the cooling water passing through the engine 20 is properly suppressed by adjusting the heater core transferred heat amount such that the heater core transferred heat amount follows the target heat amount line.

In addition, in the present embodiment, the heater core transferred heat amount is actively adjusted before the blowing start time at which the heater core transferred heat amount starts to be actually used. As a result, a condition where the heater core transferred heat amount is equal to the required heat amount is realized at the blowing start time. Therefore, the heating or the like which is originally desired by the driver starts to be used at the same time as the blowing start time. Incidentally, if the heater core transferred heat amount starts to be adjusted after the blowing start time, the heater core transferred heat amount is sometimes less than the heater core required heat amount at the blowing start time. Thus, the adjustment amount of the output of the engine 20 is easy to be relatively large to make the heater core transferred heat amount rapidly become to be equal to the heater core required heat amount. Alternatively, there is a possibility that the third operation which makes the cooling water flow into the engine 20 is performed at the highly probability to make the heater core transferred heat amount rapidly become to be equal to the heater core required heat amount. However, in the present embodiment, since the heater core transferred heat amount is actively adjusted before the blowing start time, the heater core transferred heat amount can be adjusted such that the heater core transferred heat amount is equal to the heater core required heat amount at the blowing start time even if the adjustment amount of the output of the engine 20 is relatively small. Alternatively, the heater core transferred heat amount can be adjusted such that the heater core transferred heat amount is equal to the heater core required heat amount at the blowing start time even if the third operation is not performed over a long period or many times. Therefore, the uncomfortable feeling of the driver can be suppressed or eliminated and the deterioration of the fuel cost which is caused by the cooling water passing through the engine 20 is properly suppressed by actively adjusting the heater core transferred heat amount before the blowing start time.

Incidentally, the above described explanation explains the case where the hybrid vehicle 1 is a split type of hybrid vehicle in which the engine 20 and the motor generators MG1 and MG2 are coupled with each other via the power dividing mechanism. However, the cooling apparatus may be controlled in the above described manner in a parallel type or a series type of hybrid vehicle which has one motor generator or two motor generators. Furthermore, the cooling apparatus may be controlled in the above described manner in a vehicle which does not move by using the driving power of the motor generator (namely, which only moves by using the driving power of the engine 20). In any case, the above described effect can be realized.

The present invention is not limited to the aforementioned embodiments, but various changes may be made, if desired, without departing from the essence or spirit of the invention which can be read from the claims and the entire specification. A cooling water control apparatus, which involves such changes, is also intended to be within the technical scope of the present invention.

REFERENCE SIGNS LIST 1 hybrid vehicle
10 water apparatus
11 exhaust heat recovery equipment
12 heater core
13 flow amount adjusting valve
14 radiator
15 thermostat
16 electric WP
17 water temperature sensor
18 cooling water pipe
18a cooling water pipe
18b cooling water pipe
181a cooling water pipe
181b cooling water pipe
181c cooling water pipe
182a cooling water pipe
182b cooling water pipe
182c cooling water pipe
183a cooling water pipe
183b cooling water pipe
20 engine
30 ECU
31 heat amount determining unit
32 flow amount adjusting unit
33 output adjusting unit

The invention claimed is:

1. A cooling water control apparatus which controls a cooling apparatus of an engine, the engine having at least one sensor for outputting information regarding cooling water temperature of cooling water that circulates through the cooling apparatus, the cooling apparatus having: (i) a first pipe in which the cooling water circulates via a pump between an exhaust heat recovery equipment and a heater core while bypassing the engine; and (ii) a second pipe in which the cooling water circulates via the pump between the engine and the heater core, the cooling water control apparatus having a controller including a processor and memory, and the controller configured to receive the cooling water temperature information output from the at least one sensor:

the controller being configured to set a target heat amount line such that a condition where a transferred heat amount which is transferred to the heater core is equal to a required heat amount which is required by the heater core is satisfied at a desired time point at which the transferred heat amount starts to be actually used, the target heat amount line representing a successive target value of the transferred heat amount during a period until the desired time point; and the controller being configured to (i-1) make the cooling water circulate in the first pipe and (i-2) stop the circulation of the cooling water in the second pipe by closing a flow amount adjusting valve, and (ii) adjust an output of the engine such that the transferred heat amount follows the target heat amount line.

2. The cooling water control apparatus according to claim 1, wherein the target heat amount line represents, as the successive target value of the transferred heat amount, a continuous or discontinuous target value, which increases in a continuous manner or a stepwise manner during the period until the desired time point, of the transferred heat amount during the period until the desired time point.

3. The cooling water control apparatus according to claim 1, wherein the controller is configured to adjust the output of the engine such that the output of the engine increases or decreases by a fixed amount compared to the output before the output of the engine is adjusted.

4. The cooling water control apparatus according to claim 1, wherein the controller is further configured to (i) make the cooling water circulate in the first pipe and (ii) make the cooling water circulate in the second pipe when the transferred heat amount is less than the target heat amount line in spite of the adjustment of the output of the engine by opening the flow amount adjusting valve and closing a thermostat.

5. The cooling water control apparatus according to claim 4, wherein the controller is configured to adjust a flow amount of the cooling water which circulates in the second pipe such that the transferred heat amount follows the target heat amount line.

6. The cooling water control apparatus according to claim 5, wherein (i) the controller is configured to decrease an adjustment amount of the output of the engine and (ii) the controller is configured to increase an adjustment amount of the flow amount of the cooling water which circulates in the second pipe, when a vehicle which has the cooling water control apparatus moves in a condition for giving weight to a ride quality, compared to the case where the vehicle moves in a condition for giving weight to a fuel cost.

7. The cooling water control apparatus according to claim 1, wherein the controller is configured to adjust the output of the engine by adjusting a torque of the engine while maintaining a rotational number of the engine.

8. The cooling water control apparatus according to claim 1, wherein the controller is configured to (i) make the cooling water circulate in the first pipe while adjusting a flow amount of the cooling water which circulates in the first pipe such that the transferred heat amount follows the target heat amount line and (ii) stop the circulation of the cooling water in the second pipe, when the adjustment of the flow amount of the cooling water which circulates in the first pipe allows the transferred heat amount to follow the target heat amount line under a condition where the circulation of the cooling water in the second pipe stops, the controller is configured to (i-1) make the cooling water circulate in the first pipe, (i-2) stop the circulation of the cooling water in the second pipe and (ii) adjust the output of the engine such that the transferred heat amount follows the target heat amount line, when the adjustment of the flow amount of the cooling water which circulates in the first pipe does not allow the transferred heat amount to follow the target heat amount line under the condition where the circulation of the cooling water in the second pipe stops.

9. The cooling water control apparatus according to claim 8, wherein the controller is further configured to (i) make the cooling water circulate in the first pipe and (ii) make the cooling water circulate in the second pipe, when the adjustment of the flow amount of the cooling water which circulates in the first pipe does not allow the transferred heat amount to follow the target heat amount line under the condition where the circulation of the cooling water in the second pipe stops and the transferred heat amount is less than the target heat amount line in spite of the adjustment of the output of the engine.

* * * * *